US008218245B2

(12) United States Patent
Miyajima

(10) Patent No.: US 8,218,245 B2
(45) Date of Patent: Jul. 10, 2012

(54) ZOOM LENS

(75) Inventor: Toru Miyajima, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 296 days.

(21) Appl. No.: 12/661,055

(22) Filed: Mar. 9, 2010

(65) Prior Publication Data

US 2010/0238563 A1    Sep. 23, 2010

(30) Foreign Application Priority Data

Mar. 17, 2009   (JP) ................... 2009-064692

(51) Int. Cl.
    *G02B 15/14*      (2006.01)
(52) U.S. Cl. ..................................... 359/684
(58) Field of Classification Search .................. 359/687, 359/774
See application file for complete search history.

(56) References Cited

U.S. PATENT DOCUMENTS 4,657,351 A * 4/1987 Mori ............................. 359/687

FOREIGN PATENT DOCUMENTS

| JP | 08-220439 | 8/1996 |
|---|---|---|
| JP | 2003-177317 | 6/2003 |
| JP | 2003-241097 | 8/2003 |

* cited by examiner

*Primary Examiner* — Joseph P Martinez
(74) *Attorney, Agent, or Firm* — Kenyon & Kenyon LLP

(57) ABSTRACT

A zoom lens includes, from an object side in the following order: a first lens group that has a positive refractive power; a second lens group that has a negative refractive power; a third lens group that has a positive refractive power; and a fourth lens group that has a positive refractive power, wherein: when magnification is changed from a wide angle end to a telephoto end, the lens groups each move so as to increase the distance between the first and second lens groups and to decrease the distance between the second and third lens groups and the distance between the third and fourth lens groups; and the following conditional expressions (1) and (2) are satisfied:

$5.5 < f1/fw < 8.0$      (1); and $0.5 < \Sigma d3/\Sigma d4 < 0.9$      (2)

where
    fw is the focal length of the wide angle end;
    f1 is the focal length of the first lens group;
    $\Sigma d3$ is the actual distance on an optical axis from the lens surface that is closest to an object to the lens surface that is closest to an image in the third lens group; and
    $\Sigma d4$ is the actual distance on an optical axis from the lens surface that is closest to the object to the lens surface that is closest to the image in the fourth lens group.

18 Claims, 17 Drawing Sheets example 1 example 2 example 3 example 4 example 5 example 6 example 7 example 8 example 1

(a)

(b)

(c)

example 2 example 3 example 4 example 5

(a)

(b)

(c)

example 7

ZOOM LENS

This application claims benefit of Japanese Application No. 2009-064692 filed in Japan on Mar. 17, 2009, the contents of which are incorporated by this reference.

BACKGROUND OF THE INVENTION

The present invention relates to a zoom lens and particularly to a zoom lens that is used in an interchangeable lens of a single lens reflex camera and the like and has a high variable magnification ratio ranging from a wide angle to a medium telephoto or telephoto range.

Conventionally, as a zoom lens that is used in an interchangeable lens of a single lens reflex camera and the like and has a high variable magnification ratio covering a range of focal lengths from wide-angle to medium telephoto or telephoto, the following zoom lens, including those disclosed in JP-A-8-220439, JP-A-2003-177317, or JP-A-2003-241097, is well known: The zoom lens includes, from an object side in the following order, a first lens group having a positive refractive power, a second lens group having a negative refractive power, a third lens group having a positive refractive power, and a fourth lens group having a positive refractive power. The reasons why such a configuration is employed include the following: It is easy to increase a variable magnification ratio; and it is possible to downsize the overall length thanks to the configuration in which the positive groups precede.

On the other hand, as the use of digital single lens reflex cameras has become widespread in recent years, what is required is an interchangeable lens optimized for a camera that has an image pickup element with a small image circle for 35-mm silver halide films and the like. As for such a digital-camera interchangeable lens, a higher resolution is required than for a conventional interchangeable lens for 35-mm silver halide films, and the tolerable level of chromatic aberration is also smaller.

Moreover, the ratio of the back focus to the focal length of the entire system has become larger, and, in general, the power arrangement is increasingly necessary to be that of retrofocus.

Moreover, as for a conventional zoom lens having a high variable magnification ratio, resolution is particularly lower at a telephoto end than at a wide angle end due to the effect of chromatic aberration of magnification and the like. Therefore, much higher resolution is required.

Furthermore, in terms of the specifications of the zoom lens, what are required are a much higher variable magnification ratio, a reduction in the shortest shooting distance, and the like, as well as both downsizing and lower costs.

SUMMARY OF THE INVENTION

For a first configuration, a zoom lens, from an object side in the following order, includes: a first lens group that has a positive refractive power; a second lens group that has a negative refractive power; a third lens group that has a positive refractive power; and a fourth lens group that has a positive refractive power, wherein: when magnification is changed from a wide angle end to a telephoto end, the lens groups each move so as to increase the distance between the first and second lens groups and to decrease the distance between the second and third lens groups and the distance between the third and fourth lens groups; and the following conditional expressions (1) and (2) are satisfied:

$$5.5 < f1/fw < 8.0 \quad (1); \text{ and}$$

$$0.5 < \Sigma d3/\Sigma d4 < 0.9 \quad (2)$$

where
fw is the focal length of the wide angle end;
f1 is the focal length of the first lens group;
$\Sigma d3$ is the actual distance on an optical axis from the lens surface that is closest to an object to the lens surface that is closest to an image in the third lens group; and
$\Sigma d4$ is the actual distance on an optical axis from the lens surface that is closest to the object to the lens surface that is closest to the image in the fourth lens group.

The reason why such a configuration is employed and the operation thereof will be described.

As described above, the ratio of the required back focus to the focal length has become larger in a zoom lens for digital cameras. Therefore, it is necessary to strengthen a so-called power arrangement of retrofocus and at the same time to meet demands for higher variable magnification ratios, downsizing, and the like.

The conditional expression (1) is a rule governing the ratio of the power of the first lens group to the entire power at the wide angle end. When the ratio exceeds the upper limit of the conditional expression (1) and the power of the first lens group increases, the chromatic aberration of magnification at the telephoto end particularly increases, and the required resolution cannot be obtained. When the ratio drops below the lower limit of the conditional expression (1) and the power of the first lens group decreases, it becomes difficult to secure the zoom ratio of the entire system and to reduce the overall length of lenses.

As for the conditional expression (1), it is more desirable that the following conditional expression (1)' be satisfied:

$$5.6 < f1/fw < 7.4 \quad (1)'$$

Moreover, it is more desirable that the following conditional expression (1)" satisfied:

$$6.5 < f1/fw < 7.2 \quad (1)''$$

The conditional expression (2) is a rule governing the ratio in thickness of the third lens group to the fourth lens group. When the ratio exceeds the upper limit of the conditional expression (2) and the third lens group increases in thickness, the space necessary for changing magnification decreases, leading to an increase in aberration because of an increase in power of each group. Moreover, the ratio of the burden on the third lens group in correcting field curvature to that of the fourth lens group increases, making greater impact on the decline in performance when the third and fourth lens groups are decentered. When the ratio drops below the lower limit of the conditional expression (2) and the third lens group becomes thinner, spherical aberration and axial chromatic aberration occur so much on the third lens group, and so does the change in zooming. Therefore, the ratio that is less than the lower limit of the conditional expression (2) is not desirable.

As for the conditional expression (2), it is more desirable that the following conditional expression (2)' be satisfied:

$$0.55 < \Sigma d3/\Sigma d4 < 0.8 \quad (2)'$$

Moreover, it is more desirable that the following conditional expression (2)" be satisfied:

$$0.65 < \Sigma d3/\Sigma d4 < 0.72 \quad (2)''$$

For a second configuration, a zoom lens, from an object side in the following order, includes: a first lens group that has a positive refractive power; a second lens group that has a negative refractive power; a third lens group that has a positive refractive power; and a fourth lens group that has a positive refractive power, wherein: when magnification is changed from a wide angle end to a telephoto end, the lens groups each move so as to increase the distance between the first and second lens groups and to decrease the distance between the second and third lens groups and the distance between the third and fourth lens groups; the first and second lens groups satisfy the following conditional expression (3); and all positive lenses that the first lens group includes satisfy the following conditional expression (4):

$$7<|f1/f2|<20 \qquad (3); \text{ and}$$

$$vd1p>62 \qquad (4)$$

where
 f1 is the focal length of the first lens group;
 f2 is the focal length of the second lens group; and
 vd1p is the Abbe number of each positive lens of the first lens group.

The reason why such a configuration is employed and the operation thereof will be described.

The conditional expression (3) is a rule governing the ratio of the power of the first lens group to that of the second lens group. When the ratio exceeds the upper limit of the conditional expression (3) and the power of the first lens group increases, it is difficult to secure the required back focus. Moreover, the distance from the first lens group's entrance plane of the entrance pupil increases, and it is difficult to achieve both a wider angle of view at the wide angle end and downsizing of the front element diameter. When the ratio drops below the lower limit of the conditional expression (3) and the power of the first lens group decreases, the variable magnification ratio of the second lens group decreases, and it is difficult to secure the zoom ratio of the entire system. In addition, it is difficult to reduce the overall length of lenses.

As for the conditional expression (3), it is more desirable that the following conditional expression (3)' be satisfied:

$$8.0<|f1/f2|<10.0 \qquad (3)'$$

Moreover, it is more desirable that the following conditional expression (3)" be satisfied:

$$8.3<|f1/f2|<9.0 \qquad (3)''$$

Moreover, the number that is less than the lower limit of the conditional expression (4) leads to a higher variable magnification ratio, having a great impact on the decline in resolution at the telephoto end due to aberration that occurs on the first lens group and making it difficult to correct, in particular, chromatic aberration of magnification.

As for the conditional expression (4), it is more desirable that the following conditional expression (4)' be satisfied:

$$vd1p>65 \qquad (4)'$$

Moreover, it is more desirable that the following conditional expression (4)" be satisfied:

$$vd1p>80 \qquad (4)''$$

For a third configuration, a zoom lens, from an object side in the following order, includes: a first lens group that has a positive refractive power; a second lens group that has a negative refractive power; a third lens group that has a positive refractive power; and a fourth lens group that has a positive refractive power, wherein: when magnification is changed from a wide angle end to a telephoto end, the lens groups each move so as to increase the distance between the first and second lens groups and to decrease the distance between the second and third lens groups and the distance between the third and fourth lens groups; and the second lens group moves so as to leave a convex track at the object side after moving so as to leave a convex track at an image side.

The reason why such a configuration is employed and the operation thereof will be described.

The reason why the second lens group moves around the wide angle end so as to leave a convex track at the image side when magnification is changed will be described first.

In terms of balancing the changes of astigmatism and spherical aberration, it is desirable that magnification be changed around the wide angle end while keeping a balance between the action of changing magnification by widening the air space between the first lens group and the second lens group and the action of changing magnification by moving the third and fourth lens groups to the object side. However, when magnification is changed, the height of an off-axis major optical beam passing through the first lens group increases around the wide angle end after the air space between the first and second lens groups is widened. Therefore, the problem is the increased size of the first lens group in the radial direction. Thus, in terms of balancing the size of a lens barrel and aberration, it is desirable that the action of changing magnification be realized by moving the second lens group to the image side and that the balance be kept in changing magnification, in order to reduce the burden required to change magnification by widening the air space between the first and second lens groups and to prevent an increase in the radial size of the first lens group. As a result, the second lens group moves so as to leave a track at the image side.

After magnification is changed to a certain degree, the angle of view decreases. Therefore, even if the space between the first and second lens groups widens, the height of a peripheral major optical beam passing through the first lens group does not increase. The action of changing magnification by moving the second lens group to the image side is unnecessary. Instead, a space is required to move the third and fourth lens groups to the object side. As a result, the second lens group reverses the course to move to the object side.

The following describes the reason why the second lens group moves around the telephoto end so as to leave a convex track at the object side when magnification is changed. When magnification is changed, around the telephoto end, the action of changing magnification by moving the second lens group to the image side is realized again, in order to prevent an increase in the overall length due to the excessively widened space between the first and second lens groups; it is desirable that the increase in the overall length at the telephoto end, which could be caused by the widened space between the first and second lens groups, be controlled. As a result, the second lens group reverses the course again to move so as to leave a track at the image side, making it possible to keep the balance between downsizing of the lens barrel and correction of aberration.

Moreover, it is desirable that the zoom lens satisfy the following conditional expression (5) in terms of the power of the second lens group:

$$0.7<|f2/fw|<0.9 \qquad (5)$$

where
 f2 is the focal length of the second lens group; and
 fw is the focal length of the entire system at the wide angle end.

When exceeding the upper limit of the conditional expression (5), the power of the second lens group is too weak. Therefore, the amount of travel is too large to increase a variable magnification ratio, resulting in an increase in size of the lens barrel. When dropping below the lower limit of the conditional expression (5), the power is too strong, making it difficult to correct various types of aberration such as field curvature and distortion.

As for the conditional expression (5), it is more desirable that the following conditional expression (5)' be satisfied:

$$0.75<|f2/fw|<0.90 \qquad (5)'$$

Moreover, it is more desirable that the following conditional expression (5)" be satisfied:

$$0.80<|f2/fw|<0.85 \qquad (5)"$$

Furthermore, as to the distance the first lens group travels, it is desirable that the zoom lens satisfy the following conditional expression (6):

$$0.40<m1/ft<0.70 \qquad (6)$$

where m1 represents the distance the first lens group travels between the wide angle end and the telephoto end while the movement toward the object side is of positive sign; and ft is the focal length of the entire system at the telephoto end.

When the number exceeds the upper limit of the conditional expression (6), the overall length at the telephoto end increases and therefore is too large with respect to the size of the lens barrel at the wide angle end, making it difficult to form a lens frame and the like. When the number drops below the lower limit of the conditional expression (6), the overall length at the wide angle end increases while the entrance pupil moves to the image side, resulting in an increase in the diameter of the first lens group. Otherwise the overall length at the telephoto end becomes too small, the distance that each group travels when magnification is changed therefore decreases, and the power of each group becomes too large, making it impossible to correct field curvature and distortion.

As for the conditional expression (6), it is more desirable that the following conditional expression (6)' be satisfied:

$$0.44<m1/ft<0.62 \qquad (6)'$$

Moreover, it is more desirable that the following conditional expression (6)" be satisfied:

$$0.47<m1/ft<0.50 \qquad (6)"$$

Furthermore, in the zoom lens, as for the ratio of the focal length of the third lens group to the focal length of the fourth lens group, it is desirable that the following conditional expression (7) be satisfied:

$$1.2<f3/f4<5.0 \qquad (7)$$

where f3 is the focal length of the third lens group; and
f4 is the focal length of the fourth lens group.

When the ratio exceeds the upper limit of the conditional expression (7), the power of the third lens group increases, making it difficult to secure the required back focus. When the ratio drops below the lower limit of the conditional expression (7) and the power of the third lens group decreases, astigmatism and coma aberration occur too much on the fourth lens group, and the change of astigmatism during zooming is large. Therefore, the ratio dropping below the lower limit of the conditional expression (7) is not desirable.

As for the conditional expression (7), it is more desirable that the following conditional expression (7)' be satisfied:

$$1.5<f3/f4<4.0 \qquad (7)'$$

Moreover, it is more desirable that the following conditional expression (7)" be satisfied:

$$1.6<f3/f4<2.5 \qquad (7)"$$

Furthermore, it is desirable that the zoom lens satisfy the following conditional expression (8):

$$0.3<(D3w-D3t)/fw<1.0 \qquad (8)$$

where

D3w is the distance, on an optical axis and at the wide angle end, from the surface that is closest to the image in the third lens group to the surface that is closest to the object in the fourth lens group; and D3t is the distance, on an optical axis and at the telephoto end, from the surface that is closest to the image in the third lens group to the surface that is closest to the object in the fourth lens group.

When the number exceeds the upper limit of the conditional expression (8), the zoom lens needs to be closer to the fourth lens group at the wide angle end, thereby making it difficult to secure the back focus. On the other hand, when the power of the second lens group is decreased to secure the back focus, it is difficult to correct distortion and astigmatism. When the number drops below the lower limit of the conditional expression (8), it is difficult to correct the change of astigmatism and the like when magnification is changed. Imaging performance deteriorates more as the space between the third and fourth lens groups and the eccentricity change.

As for the conditional expression (8), it is more desirable that the following conditional expression (8)' be satisfied:

$$0.39<(D3w-D3t)/fw<0.80 \qquad (8)'$$

Moreover, it is more desirable that the following conditional expression (8)" be satisfied:

$$0.45<(D3w-D3t)/fw<0.75 \qquad (8)"$$

Furthermore, in the zoom lens, the second lens group includes two negative lenses that are positioned closest to the object side, and the second negative lens from the object side satisfies the following conditional expression (9):

$$-0.40<Sf_{2n2}/0.50 \qquad (9)$$

where there is the definition $Sf_{2n2}=(R_{2n2f}+R_{2n2r})/(R_{2n2f}-R_{2n2r})$;
$R_{2n2f}$ is the curvature radius of the object-side surface of the second negative lens from the object side in the second lens group; and $R_{2n2r}$ is the curvature radius of the image-side surface of the second negative lens from the object side in the second lens group.

When the number exceeds the upper limit of the conditional expression (9), the curvature of the image-side surface becomes too large, and off-axis aberration such as distortion and field curvature increases particularly at the wide angle end. When the number drops below the lower limit of the conditional expression (9), the curvature of the object-side surface similarly becomes too large, thereby excessively increasing various types of off-axis aberration at the wide angle end.

As for the conditional expression (9), it is more desirable that the following conditional expression (9)' be satisfied:

$$-0.35<Sf_{2n2}/0.42 \qquad (9)'$$

Moreover, it is more desirable that the following conditional expression (9)" be satisfied:

$$-0.30<Sf_{2n2}/0.37 \qquad (9)"$$

Furthermore, in the zoom lens, the second lens group includes an aspheric surface, making it possible to efficiently correct mainly astigmatism, distortion, and the like. In particular, the aspheric lens is the one in the second lens group that is positioned closest to the object side, making it possible to efficiently correct distortion and the like.

Furthermore, in the zoom lens, the fourth lens group includes an aspheric surface, making it possible to efficiently correct mainly astigmatism, coma aberration, and the like. In particular, the aspheric lens has a positive power and is the one in the fourth lens group that is positioned closest to the object side, making it possible to efficiently correct coma aberration and the like. Moreover, when the aspheric lens is positioned closest to the image side in the fourth lens group, it is possible to efficiently correct astigmatism and the like. It is more desirable that two aspheric lenses be disposed.

Furthermore, in the zoom lens, the second lens group consists of a front sub-unit having a negative refractive power and a rear sub-unit having a negative refractive power; and when a focusing operation is carried out, the entire second lens group moves in the direction of the optical axis while changing the distance between the front and rear sub-units. Therefore, it is possible to suppress and make the change of astigmatism small when a nearby object is brought into focus.

Such a configuration is more effective for a zoom lens having a high variable magnification ratio, such as one whose variable magnification ratio is greater than or equal to four. A zoom lens whose variable magnification ratio is greater than or equal to seven is more effective. A zoom lens whose variable magnification ratio is greater than or equal to ten is far more effective.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

Zoom lenses of first to eight embodiments of the present invention will be described. FIGS. 1 to 8 are cross-sectional views of: (a) wide angle ends (W_INF) of optical systems; (b) intermediate states (S_INF) of the optical systems; and (c) telephoto ends (T_INF) of the optical systems, according to the first to eighth embodiments.

Figure 1:
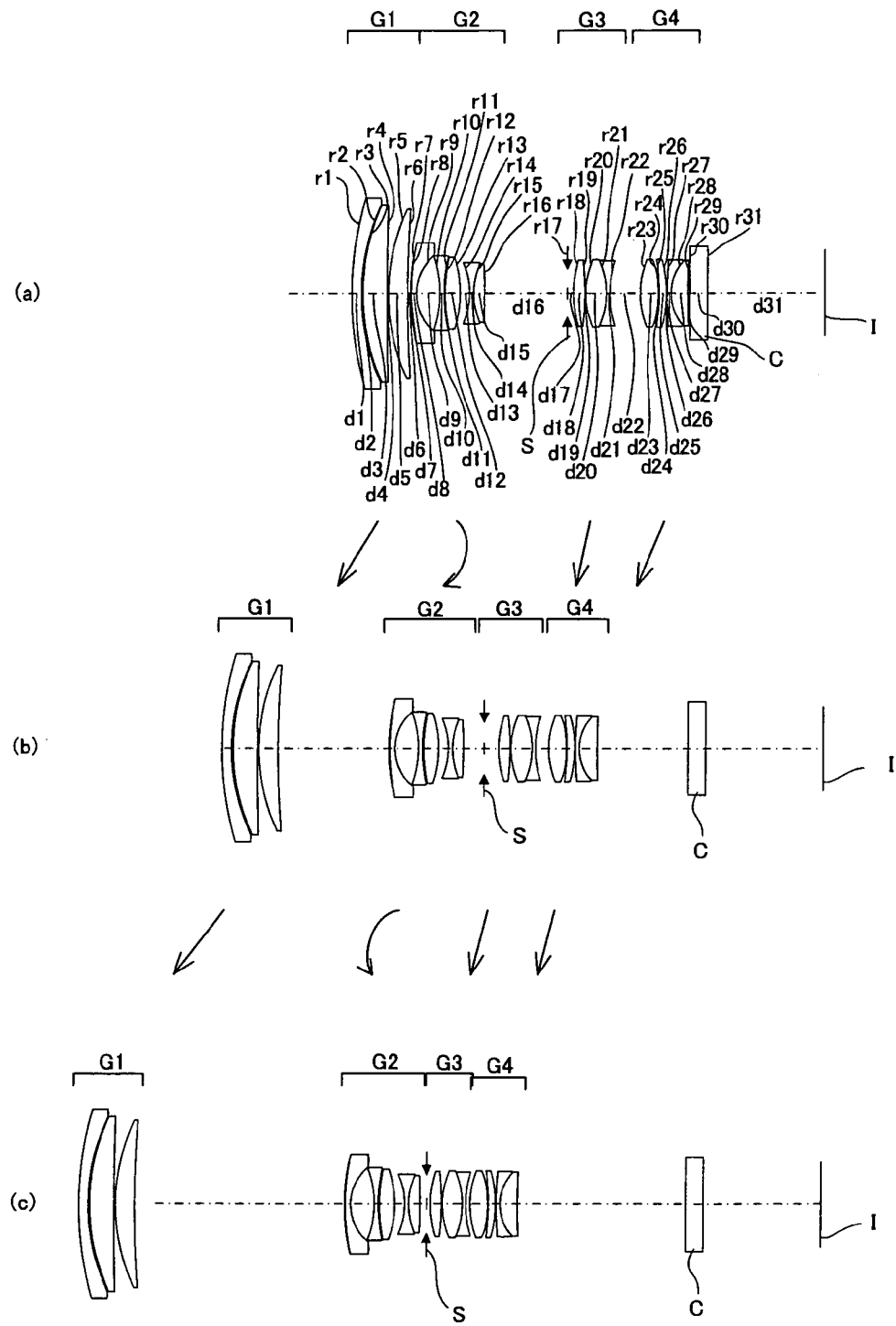
FIG. 1 is a cross-sectional view of an optical system according to a first embodiment of the present invention.

FIG. 1 is a cross-sectional view of a zoom lens of the first embodiment.

As shown in FIG. 1, the zoom lens of the first embodiment includes, from an object side in the following order, a first lens group G1 having a positive refractive power, a second lens group G2 having a negative refractive power, a third lens group G3 having a positive refractive power, and a fourth lens group G4 having a positive refractive power.

The following describes movements when magnification is changed from the wide angle end to the telephoto end.

The first lens group G1 moves toward the object side, from the wide angle end to the telephoto end.

From the wide angle end to the intermediate state, the second lens group G2 moves so as to leave a convex track at an image side and increase the distance from the first lens group G1 while decreasing the distance from the third lens group G3. In the intermediate state, the second lens group G2 is positioned slightly closer to the object side than to the wide angle end. From the intermediate state to the telephoto end, the second lens group G2 moves so as to leave a convex track at the object side and increase the distance from the first lens group G1 while decreasing the distance from the third lens group G3. At the telephoto end, the second lens group G2 is positioned closer to the object side than when the second lens group G2 is in the intermediate state.

From the wide angle end to the telephoto end, the third lens group G3 moves toward the object side so as to decrease the distance from the second lens group G2 and the distance from the fourth lens group G4.

From the wide angle end to the telephoto end, the fourth lens group G4 moves toward the object side so as to decrease the distance from the third lens group G3 and increase the distance from an image surface I.

The following describes movements when magnification is changed from the wide angle end to the telephoto end at a time when OD is equal to 400 mm.

The first lens group G1 moves toward the object side, from the wide angle end to the telephoto end.

From the wide angle end to the intermediate state, the second lens group G2 moves so as to leave a convex track at the image side and increase the distance from the first lens group G1 while decreasing the distance from the third lens group G3. In the intermediate state, the second lens group G2 is positioned closer to the object side than to the wide angle end. From the intermediate state to the telephoto end, the second lens group G2 moves toward the object side so as to increase the distance from the first lens group G1 and increase the distance from the third lens group G3 after decreasing the distance from the third lens group G3.

From the wide angle end to the intermediate state, the third lens group G3 moves toward the object side so as to decrease the distance from the second lens group G2 and the distance from the fourth lens group G4. From the intermediate state to the telephoto end, the third lens group G3 moves toward the object side so as to decrease the distance from the fourth lens group G4 and increase the distance from the second lens group G2 after decreasing the distance from the second lens group G2.

From the wide angle end to the telephoto end, the fourth lens group G4 moves toward the object side so as to decrease the distance from the third lens group G3 and increase the distance from the image surface I.

The first lens group G1 includes, from the object side in the following order, a negative meniscus lens whose convex surface faces to the object side, a positive meniscus lens whose convex surface faces to the object side, and a positive meniscus lens L13 whose convex surface faces to the object side.

The second lens group G2 includes, from the object side in the following order, a cemented lens having a negative meniscus lens whose convex surface faces to the object side and a negative meniscus lens whose convex surface faces to the object side, a biconcave negative lens, a biconvex positive lens, and a cemented lens having a biconcave negative lens and a biconvex positive lens.

The third lens group G3 includes an aperture diaphragm S, a biconvex positive lens, and a cemented lens having a biconvex positive lens and a biconcave negative lens.

The fourth lens group G4 includes a biconvex positive lens, a positive meniscus lens whose convex surface faces to an image side, and a cemented lens having a negative meniscus lens whose convex surface faces to the object side and a positive meniscus lens whose convex surface faces to the object side.

The reference mark C represents a cover glass, and the reference mark I represents an image surface.

Aspheric surfaces are used for the following four surfaces: the surface that is closest to the object in the object-side cemented lens of the second lens group G2, both surfaces of the biconvex positive lens of the fourth lens group G4, and the surface that is closest to the image in the cemented lens.

Figure 2:
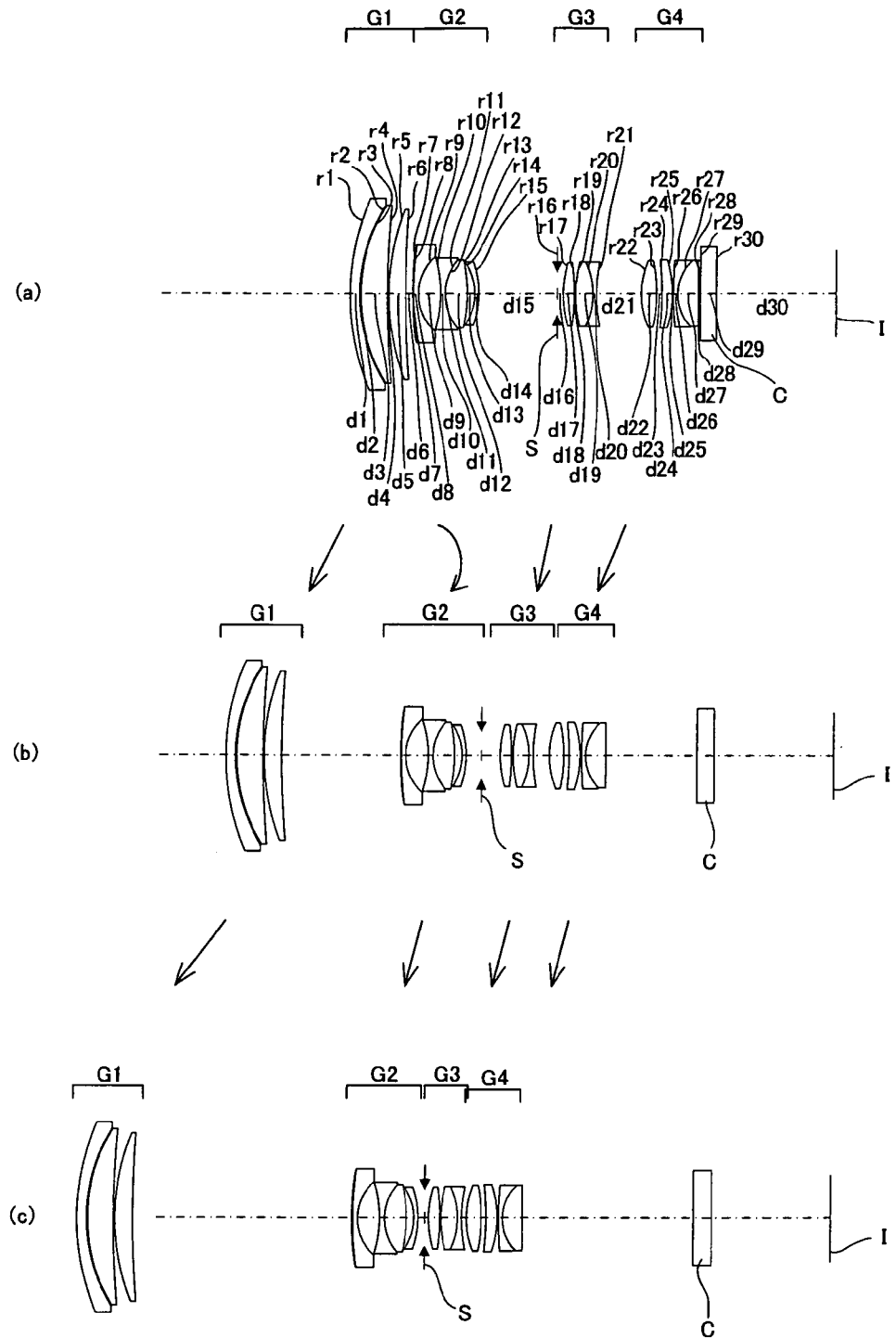
FIG. 2 is a cross-sectional view of an optical system according to a second embodiment of the present invention.

FIG. 2 is a cross-sectional view of a zoom lens of the second embodiment.

As shown in FIG. 2, the zoom lens of the second embodiment includes, from an object side in the following order, a first lens group G1 having a positive refractive power, a second lens group G2 having a negative refractive power, a third lens group G3 having a positive refractive power, and a fourth lens group G4 having a positive refractive power.

The following describes movements when magnification is changed from the wide angle end to the telephoto end.

The first lens group G1 moves toward the object side, from the wide angle end to the telephoto end.

From the wide angle end to the intermediate state, the second lens group G2 moves so as to leave a convex track at an image side and increase the distance from the first lens group G1 while decreasing the distance from the third lens group G3. In the intermediate state, the second lens group G2 is positioned slightly closer to the image side than to the wide angle end. From the intermediate state to the telephoto end, the second lens group G2 moves toward the object side so as to increase the distance from the first lens group G1 while decreasing the distance from the third lens group G3.

From the wide angle end to the telephoto end, the third lens group G3 moves toward the object side so as to decrease the distance from the second lens group G2 and the distance from the fourth lens group G4.

From the wide angle end to the telephoto end, the fourth lens group G4 moves toward the object side so as to decrease the distance from the third lens group G3 and increase the distance from an image surface I.

The following describes movements when magnification is changed from the wide angle end to the telephoto end at a time when OD is equal to 400 mm.

The first lens group G1 moves toward the object side, from the wide angle end to the telephoto end.

From the wide angle end to the intermediate state, the second lens group G2 moves so as to leave a convex track at the image side and increase the distance from the first lens group G1 while decreasing the distance from the third lens group G3. In the intermediate state, the second lens group G2 is positioned slightly closer to the object side than to the wide angle end. From the intermediate state to the telephoto end, the second lens group G2 moves toward the object side so as to increase the distance from the first lens group G1 and increase the distance from the third lens group G3 after decreasing the distance from the third lens group G3.

From the wide angle end to the intermediate state, the third lens group G3 moves toward the object side so as to decrease the distance from the second lens group G2 and the distance from the fourth lens group G4. From the intermediate state to the telephoto end, the third lens group G3 moves toward the object side so as to decrease the distance from the fourth lens group G4 and increase the distance from the second lens group G2 after decreasing the distance from the second lens group G2.

From the wide angle end to the telephoto end, the fourth lens group G4 moves toward the object side so as to decrease the distance from the third lens group G3 and increase the distance from the image surface I.

The first lens group G1 includes, from the object side in the following order, a negative meniscus lens whose convex surface faces to the object side, a positive meniscus lens whose convex surface faces to the object side, and a positive meniscus lens whose convex surface faces to the object side.

The second lens group G2 includes, from the object side in the following order, a cemented lens having a negative meniscus lens whose convex surface faces to the object side and a negative meniscus lens whose convex surface faces to the object side, a cemented lens having a biconcave negative lens, a meniscus lens whose convex surface faces to the object side and a biconvex positive lens, and a negative meniscus lens whose convex surface faces to the object side.

The third lens group G3 includes an aperture diaphragm S, a biconvex positive lens, and a cemented lens having a biconvex positive lens and a biconcave negative lens.

The fourth lens group G4 includes a biconvex positive lens, a positive meniscus lens whose convex surface faces to an image side, and a cemented lens having a negative meniscus lens whose convex surface faces to the object side and a biconvex positive lens.

The reference mark C represents a cover glass, and the reference mark I represents an image surface.

Aspheric surfaces are used for the following four surfaces: the surface that is closest to the object in the object-side cemented lens of the second lens group G2, both surfaces of the biconvex positive lens of the fourth lens group G4, and the surface that is closest to the image in the cemented lens.

Figure 3:
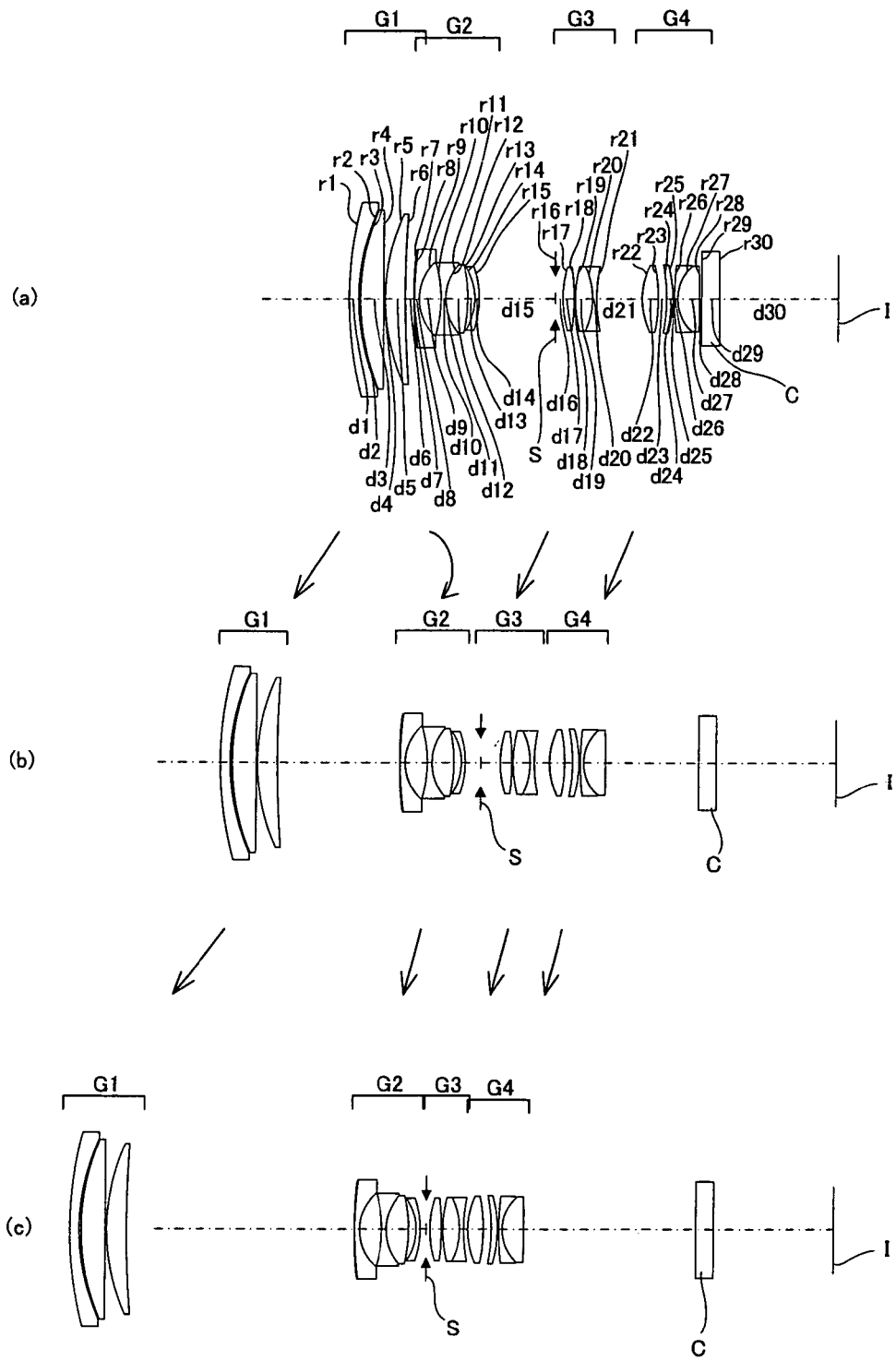
FIG. 3 is a cross-sectional view of an optical system according to a third embodiment of the present invention.

FIG. 3 is a cross-sectional view of a zoom lens of the third embodiment.

As shown in FIG. 3, the zoom lens of the third embodiment includes, from an object side in the following order, a first lens group G1 having a positive refractive power, a second lens group G2 having a negative refractive power, a third lens group G3 having a positive refractive power, and a fourth lens group G4 having a positive refractive power.

The following describes movements when magnification is changed from the wide angle end to the telephoto end.

The first lens group G1 moves toward the object side, from the wide angle end to the telephoto end.

From the wide angle end to the intermediate state, the second lens group G2 moves so as to leave a convex track at an image side and increase the distance from the first lens group G1 while decreasing the distance from the third lens group G3. In the intermediate state, the second lens group G2 is positioned slightly closer to the image side than to the wide angle end. From the intermediate state to the telephoto end, the second lens group G2 moves toward the object side so as to increase the distance from the first lens group G1 while decreasing the distance from the third lens group G3.

From the wide angle end to the telephoto end, the third lens group G3 moves toward the object side so as to decrease the distance from the second lens group G2 and the distance from the fourth lens group G4.

From the wide angle end to the telephoto end, the fourth lens group G4 moves toward the object side so as to decrease the distance from the third lens group G3 and increase the distance from an image surface I.

The following describes movements when magnification is changed from the wide angle end to the telephoto end at a time when OD is equal to 400 mm.

The first lens group G1 moves toward the object side, from the wide angle end to the telephoto end.

From the wide angle end to the intermediate state, the second lens group G2 moves so as to leave a convex track at the image side and increase the distance from the first lens group G1 while decreasing the distance from the third lens group G3. In the intermediate state, the second lens group G2 is positioned slightly closer to the object side than to the wide angle end. From the intermediate state to the telephoto end, the second lens group G2 moves toward the object side so as to increase the distance from the first lens group G1 and increase the distance from the third lens group G3 after decreasing the distance from the third lens group G3.

From the wide angle end to the intermediate state, the third lens group G3 moves toward the object side so as to decrease the distance from the second lens group G2 and the distance from the fourth lens group G4. From the intermediate state to the telephoto end, the third lens group G3 moves toward the object side so as to decrease the distance from the fourth lens group G4 and increase the distance from the second lens group G2 after decreasing the distance from the second lens group G2.

From the wide angle end to the telephoto end, the fourth lens group G4 moves toward the object side so as to decrease the distance from the third lens group G3 and increase the distance from the image surface I.

The first lens group G1 includes, from the object side in the following order, a negative meniscus lens L11 whose convex surface faces to the object side, a biconvex positive lens L12, and a positive meniscus lens L13 whose convex surface faces to the object side.

The second lens group G2 includes, from the object side in the following order, a cemented lens having a negative meniscus lens L21 whose convex surface faces to the object side and a negative meniscus lens L22 whose convex surface faces to the object side, a cemented lens having a biconcave negative lens L23, a meniscus lens L24 whose convex surface faces to the object side and a biconvex positive lens L25, and a negative meniscus lens L26 whose convex surface faces to the object side.

The third lens group G3 includes an aperture diaphragm S, a biconvex positive lens L31, and a cemented lens having a biconvex positive lens L32 and a biconcave negative lens L33.

The fourth lens group G4 includes a biconvex positive lens L41, a positive meniscus lens L42 whose convex surface faces to an image side, and a cemented lens having a negative meniscus lens L43 whose convex surface faces to the object side and a biconvex positive lens L44.

The reference mark C represents a cover glass, and the reference mark I represents an image surface.

Aspheric surfaces are used for the following four surfaces: the surface that is closest to the object in the object-side cemented lens of the second lens group G2, both surfaces of the biconvex positive lens L41 of the fourth lens group G4, and the surface that is closest to the image in the cemented lens.

Figure 4:
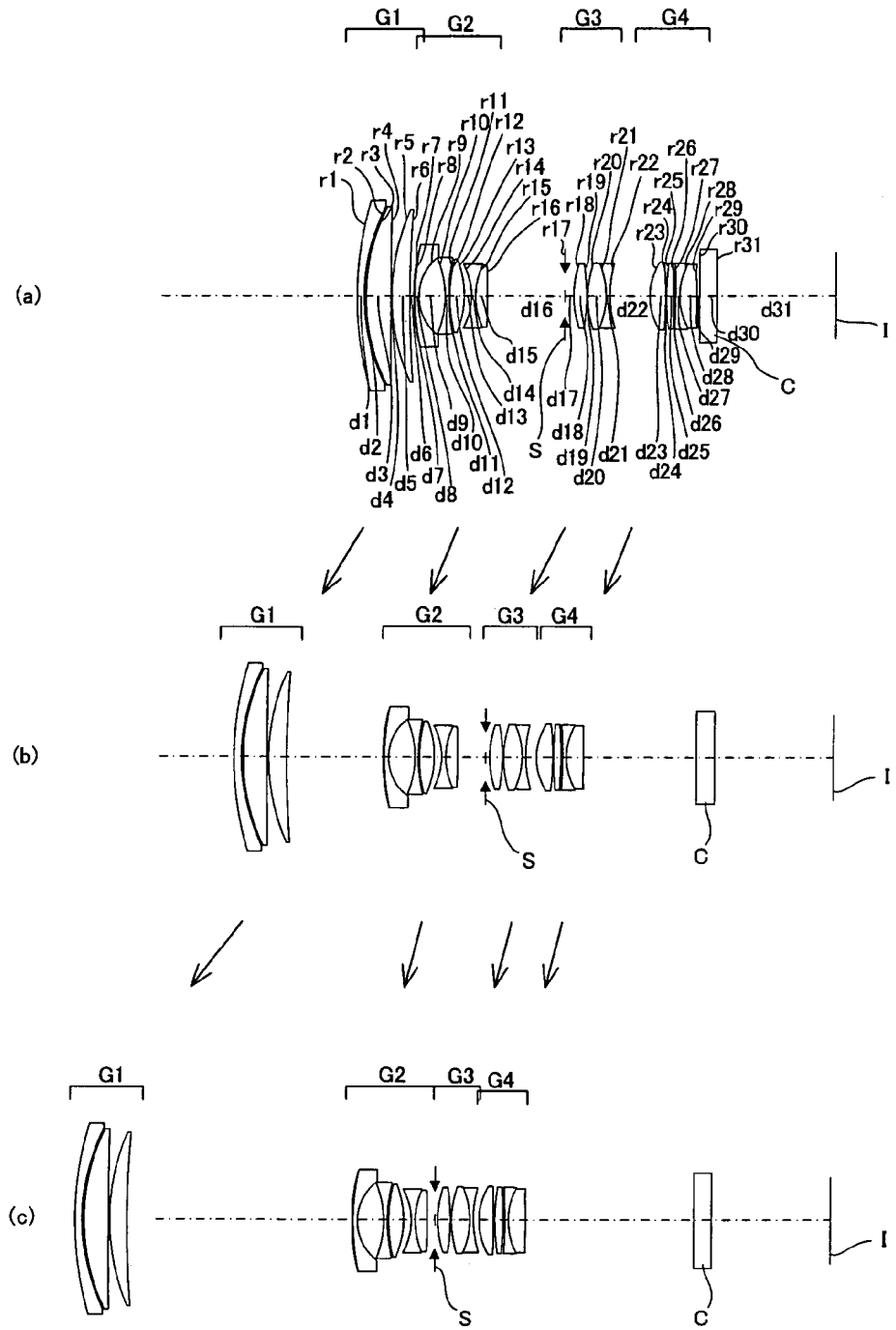
FIG. 4 is a cross-sectional view of an optical system according to a fourth embodiment of the present invention.

FIG. 4 is a cross-sectional view of a zoom lens of the fourth embodiment.

As shown in FIG. 4, the zoom lens of the fourth embodiment includes, from an object side in the following order, a first lens group G1 having a positive refractive power, a second lens group G2 having a negative refractive power, a third lens group G3 having a positive refractive power, and a fourth lens group G4 having a positive refractive power.

The following describes movements when magnification is changed from the wide angle end to the telephoto end.

The first lens group G1 moves toward the object side, from the wide angle end to the telephoto end.

From the wide angle end to the telephoto end, the second lens group G2 moves toward the object side so as to increase the distance from the first lens group G1 and decrease the distance from the third lens group G3.

From the wide angle end to the telephoto end, the third lens group G3 moves toward the object side so as to decrease the distance from the second lens group G2 and the distance from the fourth lens group G4.

From the wide angle end to the telephoto end, the fourth lens group G4 moves toward the object side so as to decrease the distance from the third lens group G3 and increase the distance from an image surface I.

The following describes movements when magnification is changed from the wide angle end to the telephoto end at a time when OD is equal to 350 mm.

The first lens group G1 moves toward the object side, from the wide angle end to the telephoto end.

From the wide angle end to the telephoto end, the second lens group G2 moves toward the object side so as to increase the distance from the first lens group G1 and decrease the distance from the third lens group G3.

From the wide angle end to the telephoto end, the third lens group G3 moves toward the object side so as to decrease the distance from the second lens group G2 and the distance from the fourth lens group G4.

From the wide angle end to the telephoto end, the fourth lens group G4 moves toward the object side so as to decrease the distance from the third lens group G3 and increase the distance from the image surface I.

The first lens group G1 includes, from the object side in the following order, a negative meniscus lens whose convex surface faces to the object side, a positive meniscus lens whose convex surface faces to the object side, and a positive meniscus lens whose convex surface faces to the object side.

The second lens group G2 includes, from the object side in the following order, a cemented lens having a negative meniscus lens whose convex surface faces to the object side and a negative meniscus lens whose convex surface faces to the object side, a biconcave negative lens, a biconvex positive lens, and a cemented lens having a biconcave negative lens and a biconvex positive lens.

The third lens group G3 includes an aperture diaphragm S, a biconvex positive lens, and a cemented lens having a biconvex positive lens and a biconcave negative lens.

The fourth lens group G4 includes a positive meniscus lens whose convex surface faces to the object side, a biconvex positive lens, and a cemented lens having a biconcave negative lens and a biconvex positive lens.

The reference mark C represents a cover glass, and the reference mark I represents an image surface.

Aspheric surfaces are used for the following four surfaces: the surface that is closest to the object in the object-side cemented lens of the second lens group G2, both surfaces of the positive meniscus lens of the fourth lens group G4, and the surface that is closest to the image in the cemented lens.

Figure 5:
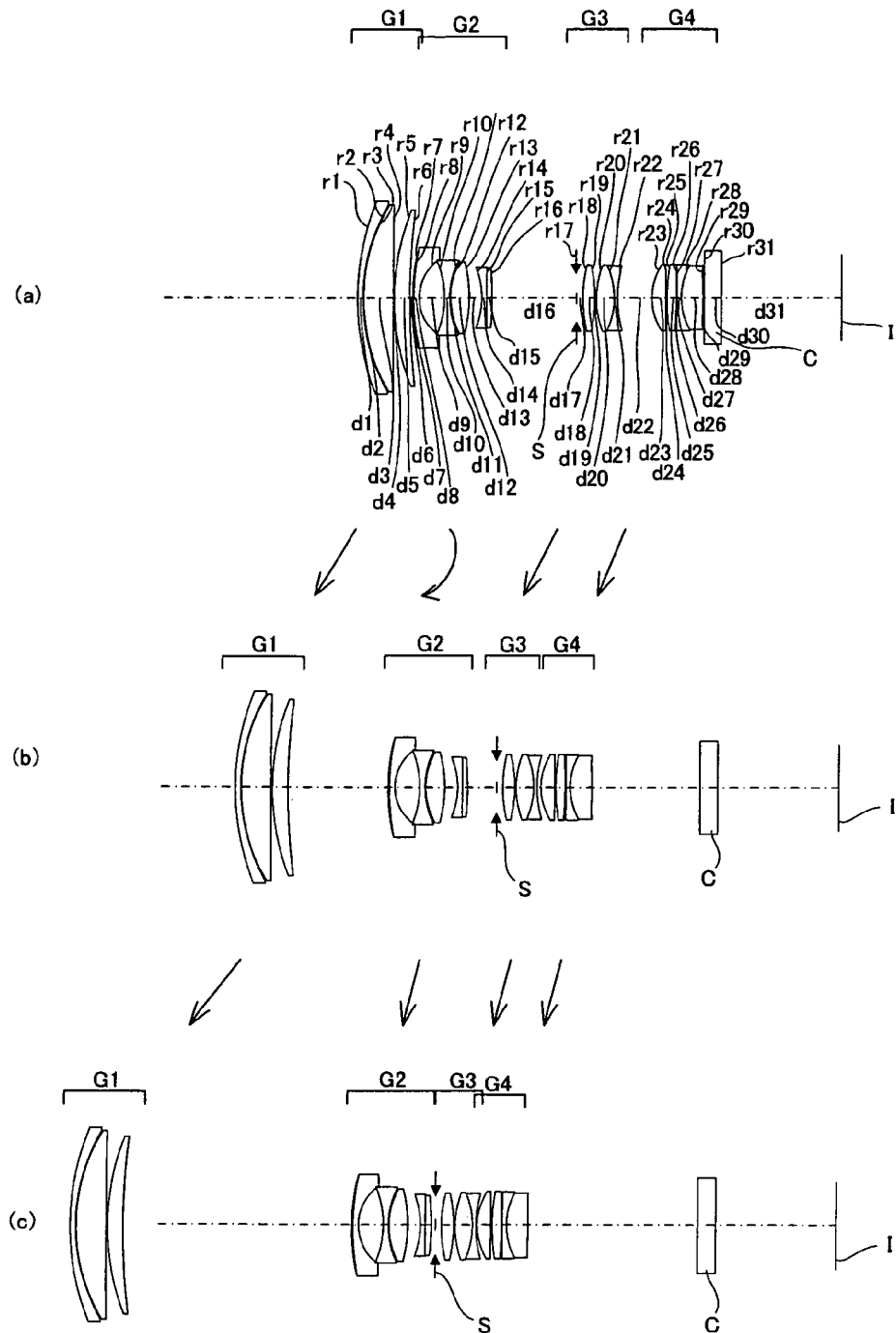
FIG. 5 is a cross-sectional view of an optical system according to a fifth embodiment of the present invention.

FIG. 5 is a cross-sectional view of a zoom lens of the fifth embodiment.

As shown in FIG. 5, the zoom lens of the fifth embodiment includes, from an object side in the following order, a first lens group G1 having a positive refractive power, a second lens group G2 having a negative refractive power, a third lens group G3 having a positive refractive power, and a fourth lens group G4 having a positive refractive power.

The following describes movements when magnification is changed from the wide angle end to the telephoto end.

The first lens group G1 moves toward the object side, from the wide angle end to the telephoto end.

From the wide angle end to the intermediate state, the second lens group G2 moves so as to leave a convex track at an image side and increase the distance from the first lens group G1 while decreasing the distance from the third lens group G3. In the intermediate state, the second lens group G2 is positioned closer to the object side than to the wide angle end. From the intermediate state to the telephoto end, the second lens group G2 moves toward the object side so as to increase the distance from the first lens group G1 while decreasing the distance from the third lens group G3.

From the wide angle end to the telephoto end, the third lens group G3 moves toward the object side so as to decrease the distance from the second lens group G2 and the distance from the fourth lens group G4.

From the wide angle end to the telephoto end, the fourth lens group G4 moves toward the object side so as to decrease the distance from the third lens group G3 and increase the distance from an image surface I.

The following describes movements when magnification is changed from the wide angle end to the telephoto end at a time when OD is equal to 250 mm.

The first lens group G1 moves toward the object side, from the wide angle end to the telephoto end.

From the wide angle end to the intermediate state, the second lens group G2 moves so as to leave a convex track at the image side and increase the distance from the first lens group G1 while decreasing the distance from the third lens group G3. In the intermediate state, the second lens group G2 is positioned closer to the object side than to the wide angle end. From the intermediate state to the telephoto end, the second lens group G2 moves toward the object side so as to increase the distance from the first lens group G1 and decrease the distance from the third lens group G3.

From the wide angle end to the telephoto end, the third lens group G3 moves toward the object side so as to decrease the distance from the second lens group G2 and the distance from the fourth lens group G4.

From the wide angle end to the telephoto end, the fourth lens group G4 moves toward the object side so as to decrease the distance from the third lens group G3 and increase the distance from the image surface I.

The first lens group G1 includes, from the object side in the following order, a negative meniscus lens whose convex surface faces to the object side, a positive meniscus lens whose convex surface faces to the object side, and a positive meniscus lens whose convex surface faces to the object side.

The second lens group G2 includes, from the object side in the following order, a cemented lens having a negative meniscus lens whose convex surface faces to the object side and a negative meniscus lens whose convex surface faces to the object side, a biconcave negative lens, a biconvex positive lens, and a cemented lens having a biconcave negative lens and a biconvex positive lens.

The third lens group G3 includes an aperture diaphragm S, a biconvex positive lens, and a cemented lens having a biconvex positive lens and a biconcave negative lens.

The fourth lens group G4 includes a positive meniscus lens whose convex surface faces to the object side, a biconvex positive lens, and a cemented lens having a biconcave negative lens and a biconvex positive lens.

The reference mark C represents a cover glass, and the reference mark I represents an image surface.

Aspheric surfaces are used for the following four surfaces: the surface that is closest to the object in the object-side cemented lens of the second lens group G2, both surfaces of the positive meniscus lens of the fourth lens group G4, and the surface that is closest to the image in the cemented lens.

Figure 6:
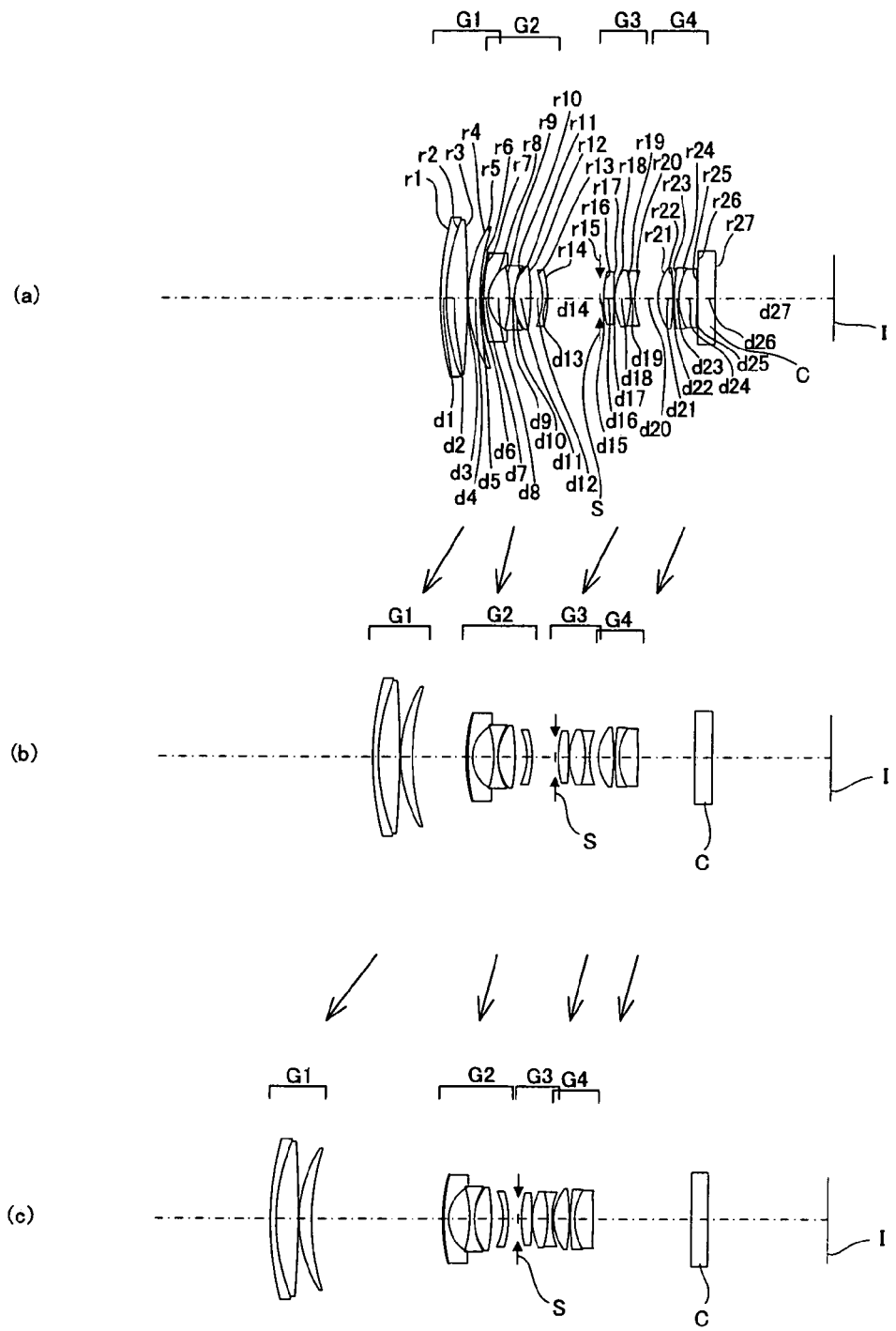
FIG. 6 is a cross-sectional view of an optical system according to a sixth embodiment of the present invention.

FIG. 6 is a cross-sectional view of a zoom lens of the sixth embodiment.

As shown in FIG. 6, the zoom lens of the sixth embodiment includes, from an object side in the following order, a first lens group G1 having a positive refractive power, a second lens group G2 having a negative refractive power, a third lens group G3 having a positive refractive power, and a fourth lens group G4 having a positive refractive power.

The following describes movements when magnification is changed from the wide angle end to the telephoto end.

The first lens group G1 moves toward the object side, from the wide angle end to the telephoto end.

From the wide angle end to the telephoto end, the second lens group G2 moves toward the object side so as to increase the distance from the first lens group G1 and decrease the distance from the third lens group G3.

From the wide angle end to the telephoto end, the third lens group G3 moves toward the object side so as to decrease the distance from the second lens group G2 and the distance from the fourth lens group G4.

From the wide angle end to the telephoto end, the fourth lens group G4 moves toward the object side so as to decrease the distance from the third lens group G3 and increase the distance from an image surface I.

The following describes movements when magnification is changed from the wide angle end to the telephoto end at a time when OD is equal to 250 mm.

The first lens group G1 moves toward the object side, from the wide angle end to the telephoto end.

From the wide angle end to the telephoto end, the second lens group G2 moves toward the object side so as to increase the distance from the first lens group G1 and decrease the distance from the third lens group G3.

From the wide angle end to the telephoto end, the third lens group G3 moves toward the object side so as to decrease the distance from the second lens group G2 and the distance from the fourth lens group G4.

From the wide angle end to the telephoto end, the fourth lens group G4 moves toward the object side so as to decrease the distance from the third lens group G3 and increase the distance from the image surface I.

The first lens group G1 includes, from the object side in the following order, a cemented lens having a negative meniscus lens whose convex surface faces to the object side and a biconvex positive lens, and a positive meniscus lens whose convex surface faces to the object side.

The second lens group G2 includes, from the object side in the following order, a cemented lens having a negative meniscus lens whose convex surface faces to the object side and a negative meniscus lens whose convex surface faces to the object side, a biconcave negative lens, a biconvex positive lens, and a negative meniscus lens whose convex surface faces to the image side.

The third lens group G3 includes an aperture diaphragm S, a biconvex positive lens, and a cemented lens having a biconvex positive lens and a biconcave negative lens.

The fourth lens group G4 includes a biconvex positive lens, and a cemented lens having a negative meniscus lens whose convex surface faces to the object side and a biconvex positive lens.

The reference mark C represents a cover glass, and the reference mark I represents an image surface.

Aspheric surfaces are used for the following four surfaces: the surface that is closest to the object in the object-side cemented lens of the second lens group G2, both surfaces of the biconvex positive lens of the fourth lens group G4, and the surface that is closest to the image in the cemented lens.

Figure 7:
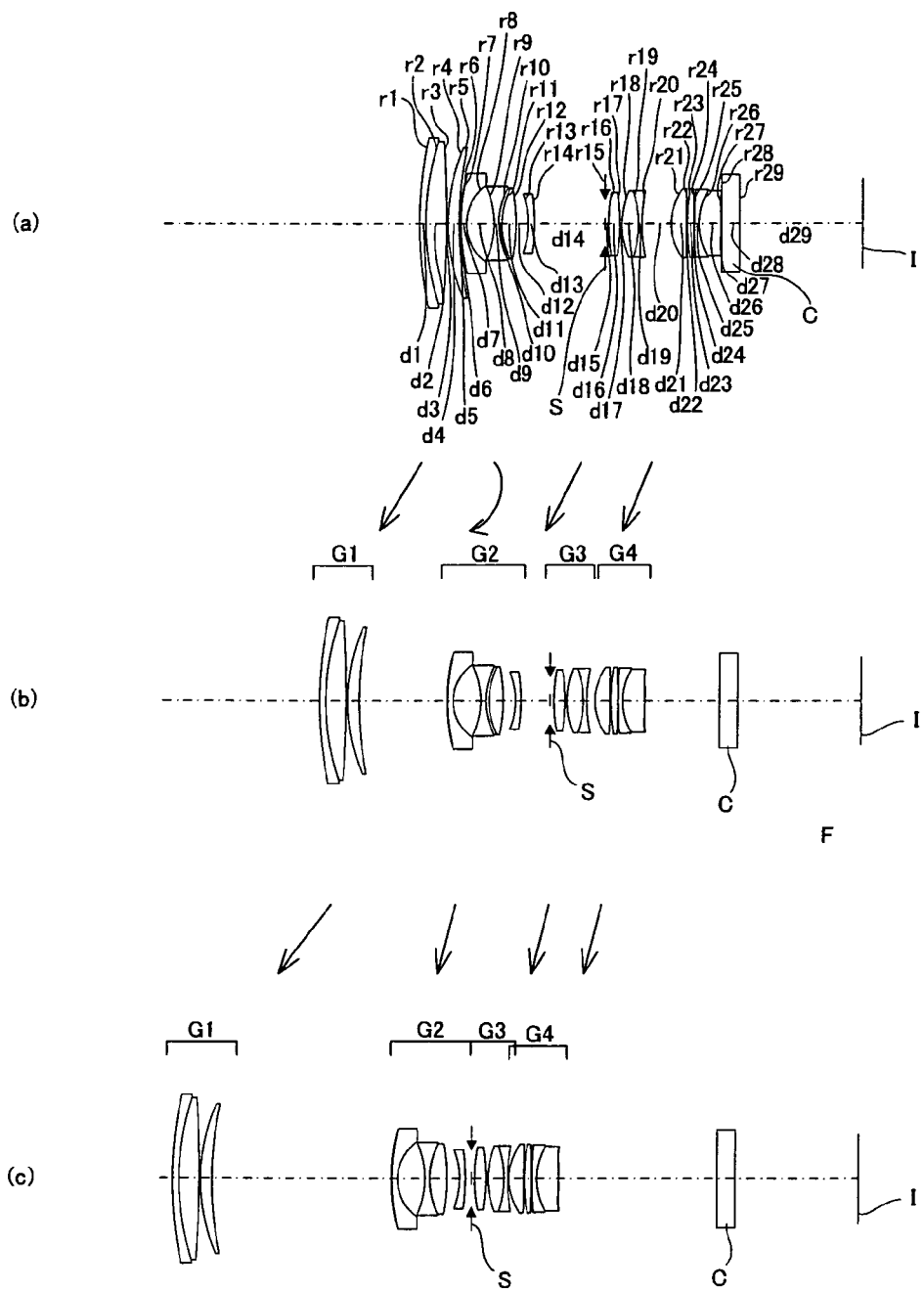
FIG. 7 is a cross-sectional view of an optical system according to a seventh embodiment of the present invention.

FIG. 7 is a cross-sectional view of a zoom lens of the seventh embodiment.

As shown in FIG. 7, the zoom lens of the seventh embodiment includes, from an object side in the following order, a first lens group G1 having a positive refractive power, a second lens group G2 having a negative refractive power, a third lens group G3 having a positive refractive power, and a fourth lens group G4 having a positive refractive power.

The following describes movements when magnification is changed from the wide angle end to the telephoto end.

The first lens group G1 moves toward the object side, from the wide angle end to the telephoto end.

From the wide angle end to the intermediate state, the second lens group G2 moves so as to leave a convex track at an image side and increase the distance from the first lens group G1 while decreasing the distance from the third lens group G3. In the intermediate state, the second lens group G2 is positioned closer to the object side than to the wide angle end. From the intermediate state to the telephoto end, the second lens group G2 moves toward the object side so as to increase the distance from the first lens group G1 while decreasing the distance from the third lens group G3.

From the wide angle end to the telephoto end, the third lens group G3 moves toward the object side so as to decrease the distance from the second lens group G2 and the distance from the fourth lens group G4.

From the wide angle end to the telephoto end, the fourth lens group G4 moves toward the object side so as to decrease the distance from the third lens group G3 and increase the distance from an image surface I.

The following describes movements when magnification is changed from the wide angle end to the telephoto end at a time when OD is equal to 250 mm.

The first lens group G1 moves toward the object side, from the wide angle end to the telephoto end.

From the wide angle end to the intermediate state, the second lens group G2 moves so as to leave a convex track at the image side and increase the distance from the first lens group G1 while decreasing the distance from the third lens group G3. In the intermediate state, the second lens group G2 is positioned closer to the object side than to the wide angle end. From the intermediate state to the telephoto end, the second lens group G2 moves toward the object side so as to increase the distance from the first lens group G1 and decrease the distance from the third lens group G3.

From the wide angle end to the telephoto end, the third lens group G3 moves toward the object side so as to decrease the distance from the second lens group G2 and the distance from the fourth lens group G4.

From the wide angle end to the telephoto end, the fourth lens group G4 moves toward the object side so as to decrease the distance from the third lens group G3 and increase the distance from the image surface I.

The first lens group G1 includes, from the object side in the following order, a cemented lens having a negative meniscus lens whose convex surface faces to the object side and a biconvex positive lens, and a positive meniscus lens whose convex surface faces to the object side.

The second lens group G2 includes, from the object side in the following order, a cemented lens having a negative meniscus lens whose convex surface faces to the object side and a negative meniscus lens whose convex surface faces to the object side, a biconcave negative lens, a biconvex positive lens, and a negative meniscus lens whose convex surface faces to the image side.

The third lens group G3 includes an aperture diaphragm S, a biconvex positive lens, and a cemented lens having a biconvex positive lens and a biconcave negative lens.

The fourth lens group G4 includes a positive meniscus lens whose convex surface faces to the object side, a biconvex positive lens, and a cemented lens having a negative meniscus lens whose convex surface faces to the object side and a biconvex positive lens.

The reference mark C represents a cover glass, and the reference mark I represents an image surface.

Aspheric surfaces are used for the following four surfaces: the surface that is closest to the object in the object-side cemented lens of the second lens group G2, both surfaces of the positive meniscus lens of the fourth lens group G4, and the surface that is closest to the image in the cemented lens.

Figure 8:
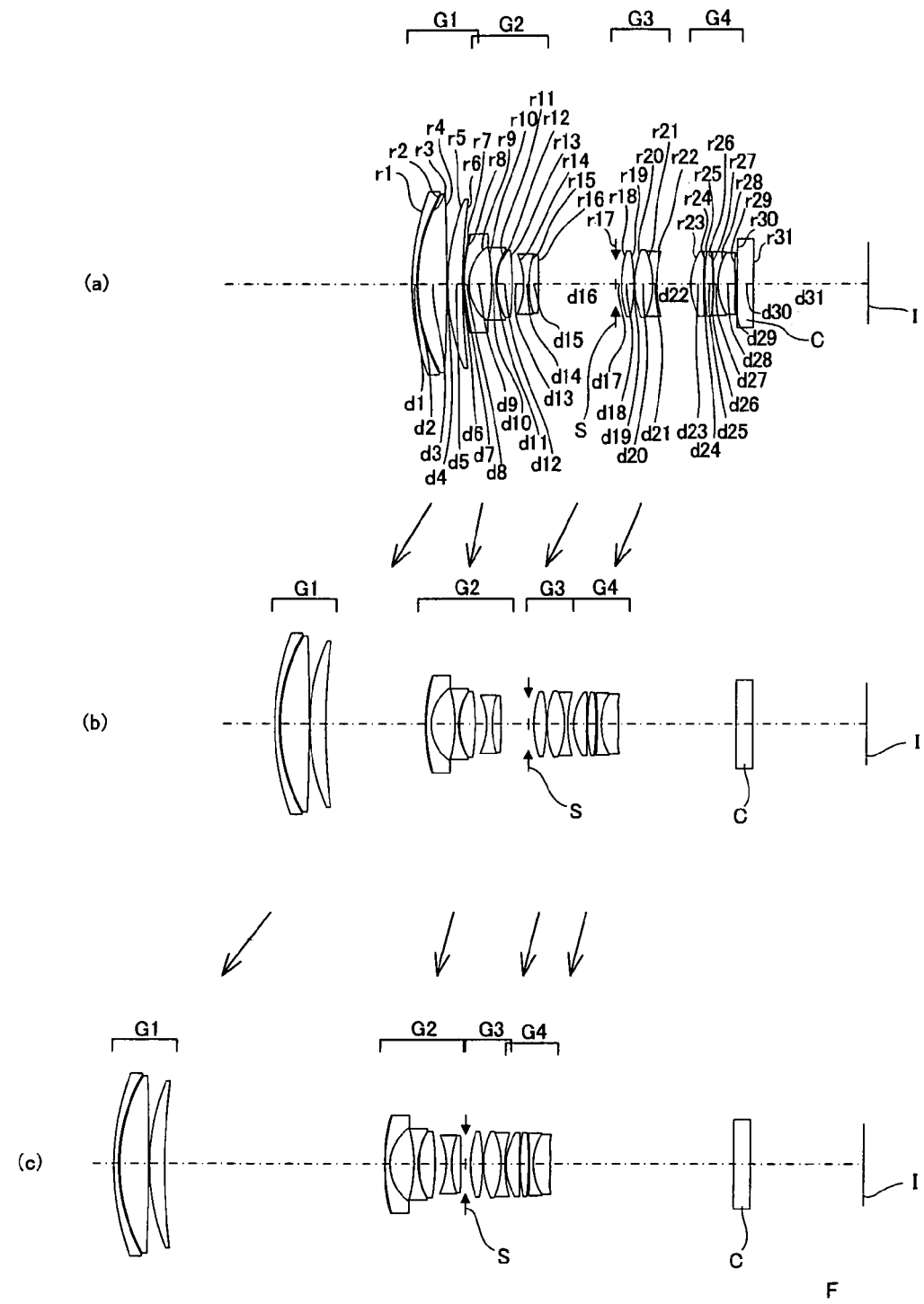
FIG. 8 is a cross-sectional view of an optical system according to an eighth embodiment of the present invention.
Figure 9:
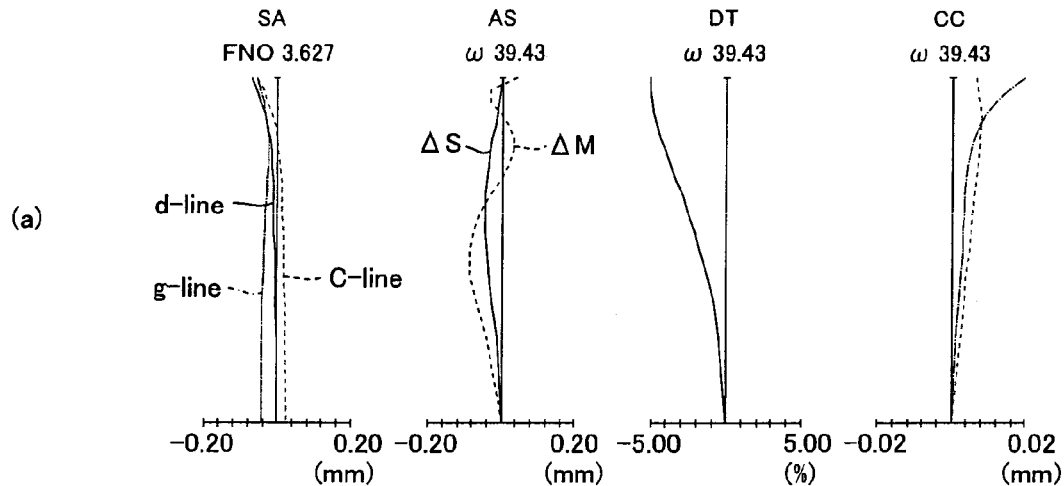
FIG. 9 is a diagram illustrating various types of aberration in an infinite-distance focusing state of the optical system according to the first embodiment.
Figure 9:
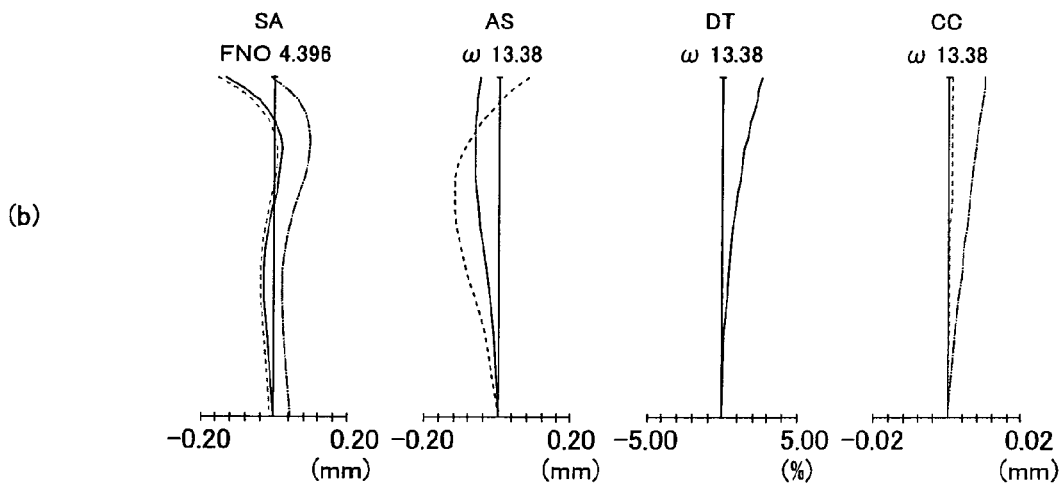
Figure 9:
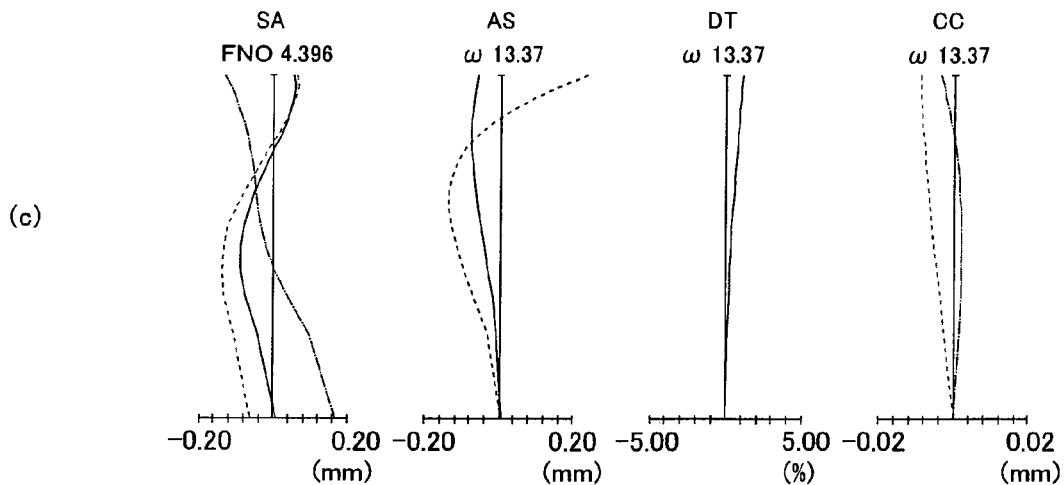
Figure 10:
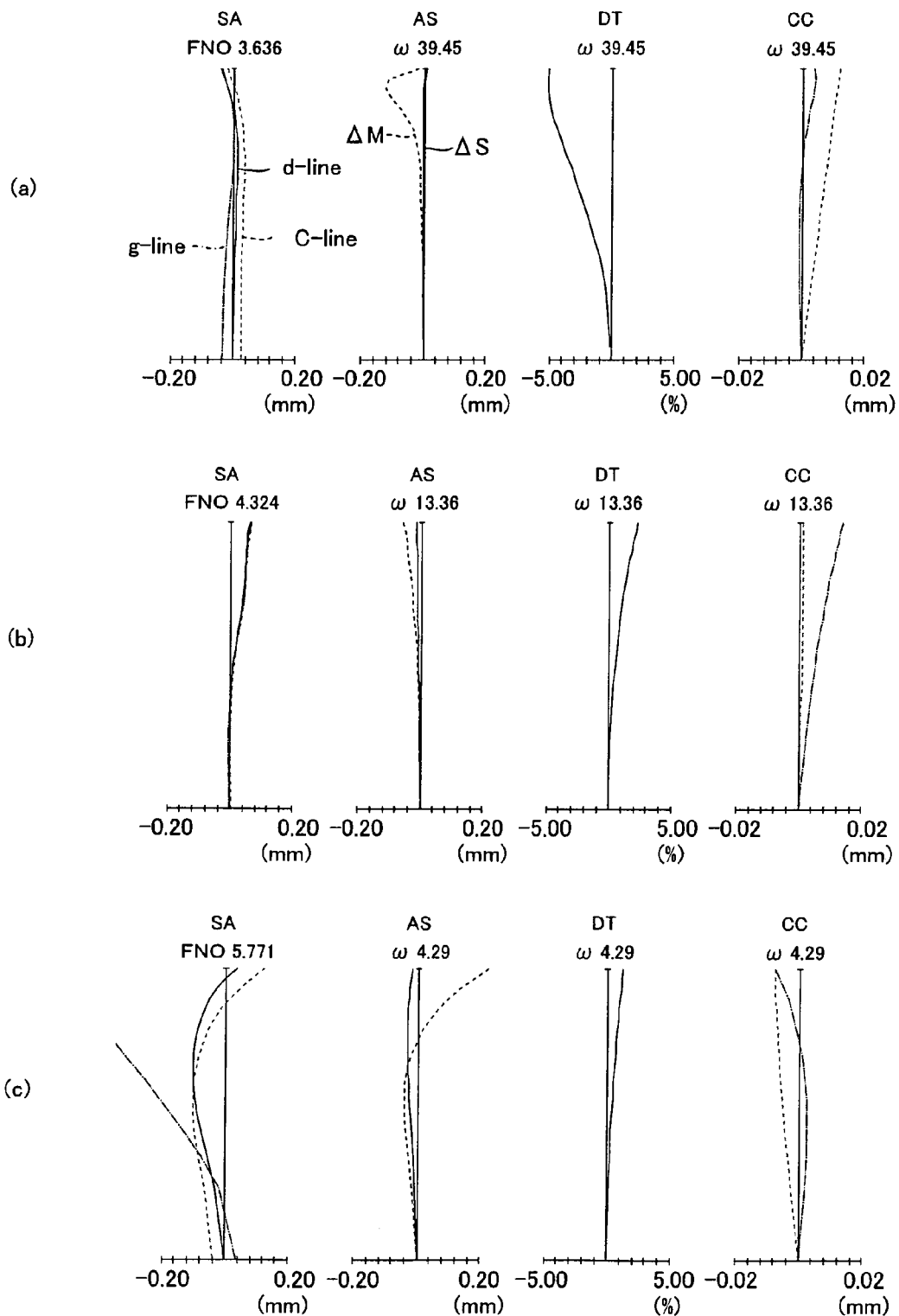
FIG. 10 is a diagram illustrating various types of aberration in an infinite-distance focusing state of the optical system according to the second embodiment.
Figure 11:
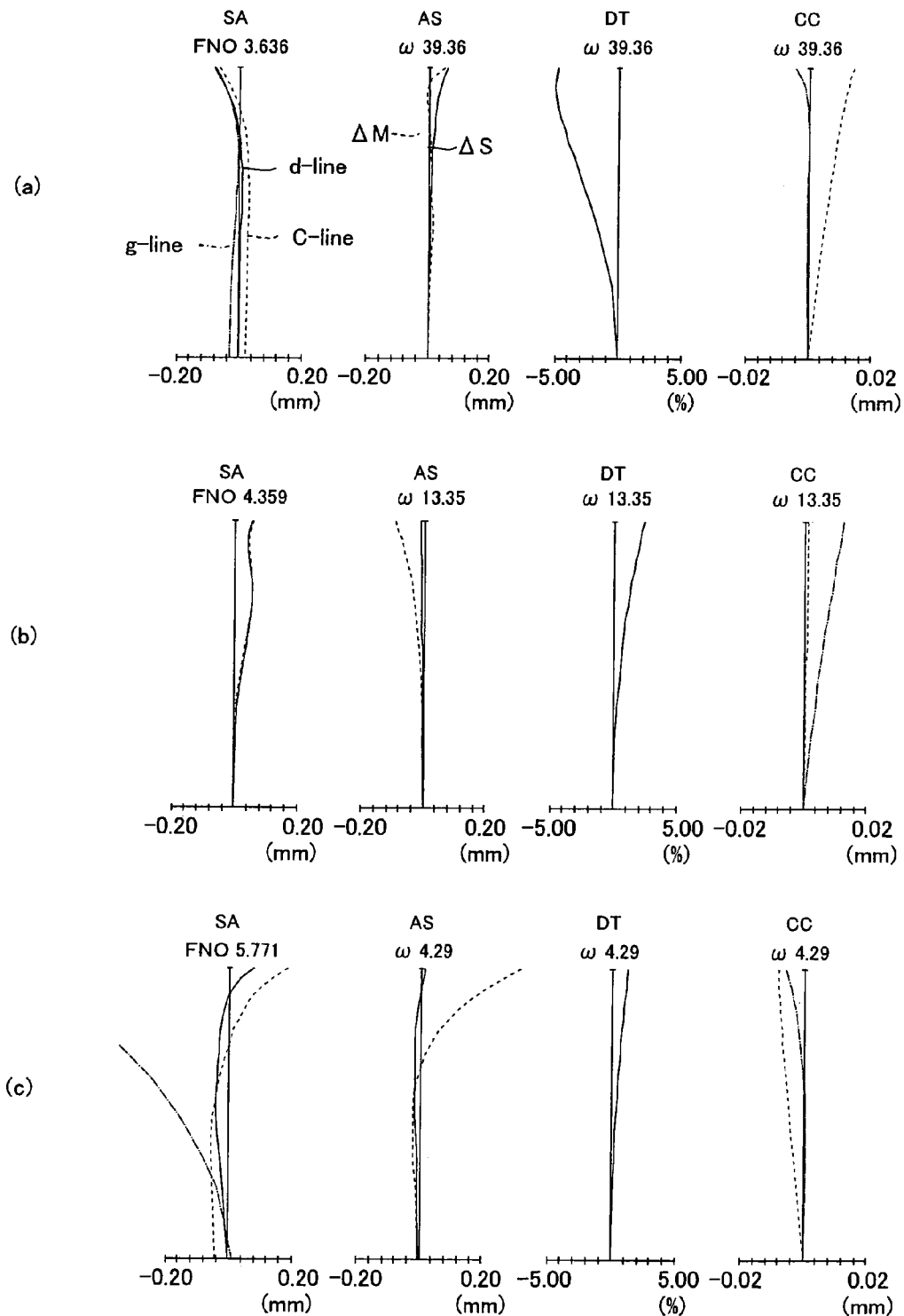
FIG. 11 is a diagram illustrating various types of aberration in an infinite-distance focusing state of the optical system according to the third embodiment.
Figure 12:
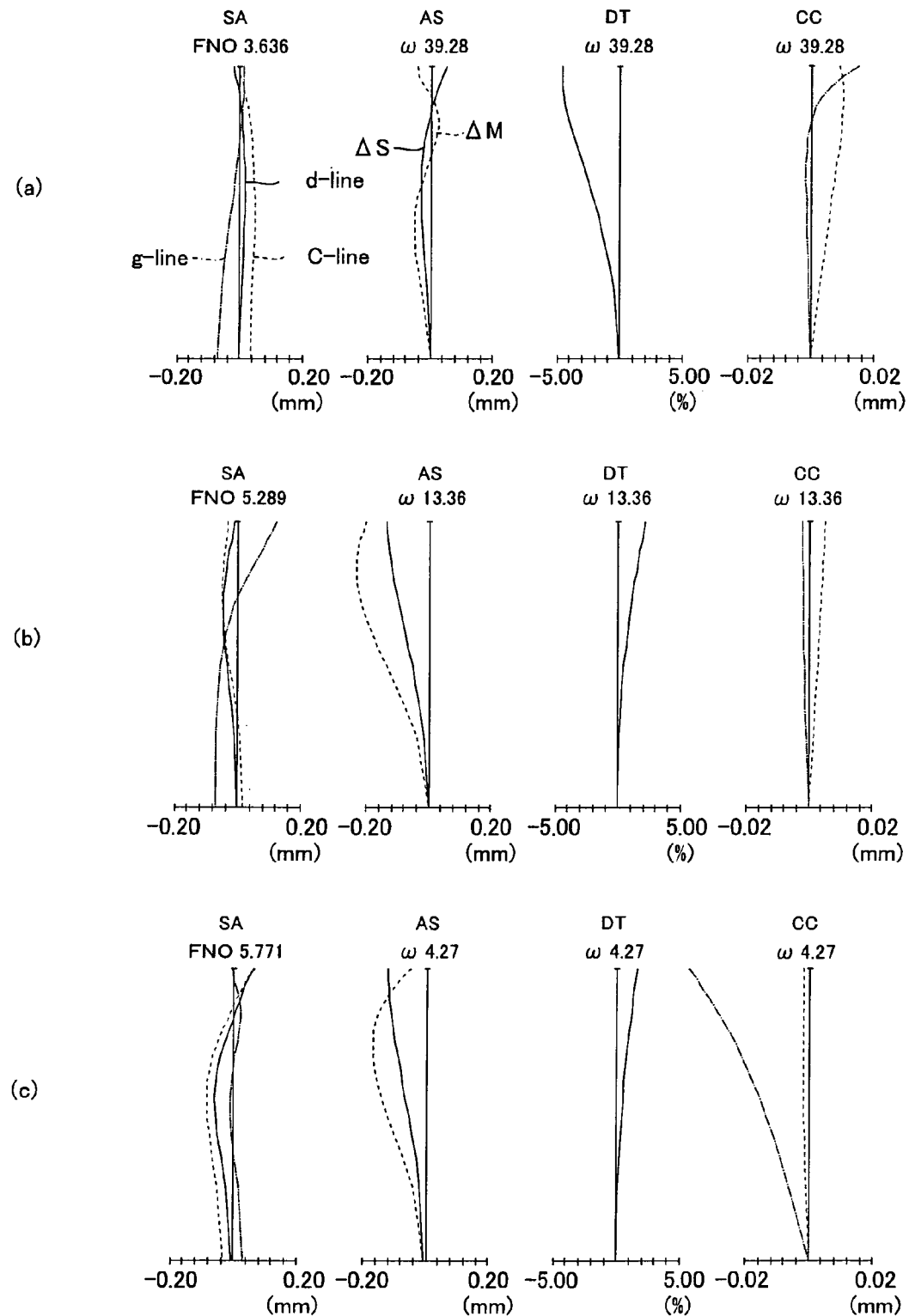
FIG. 12 is a diagram illustrating various types of aberration in an infinite-distance focusing state of the optical system according to the fourth embodiment.
Figure 13:
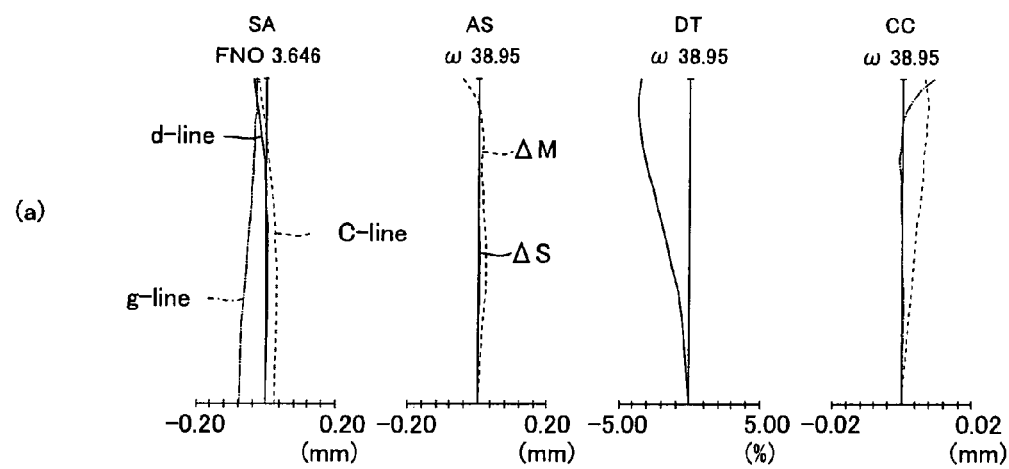
FIG. 13 is a diagram illustrating various types of aberration in an infinite-distance focusing state of the optical system according to the fifth embodiment.
Figure 13:
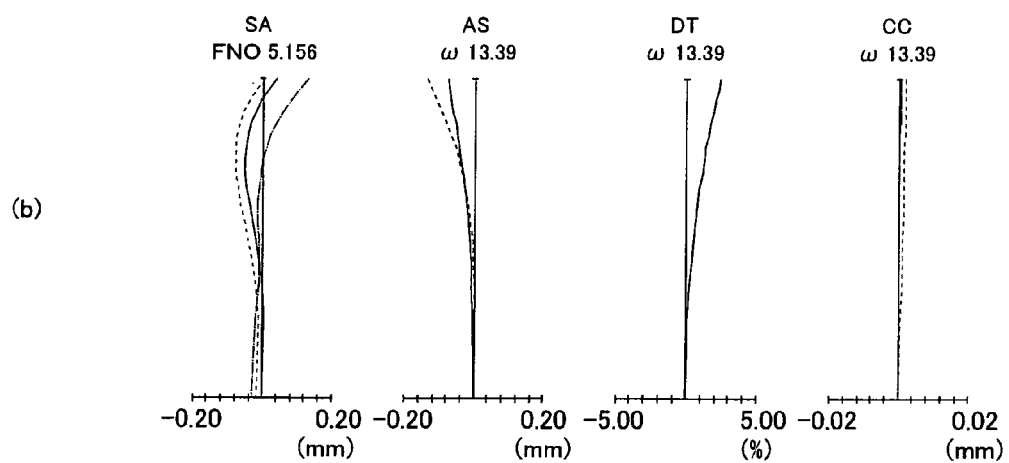
Figure 13:
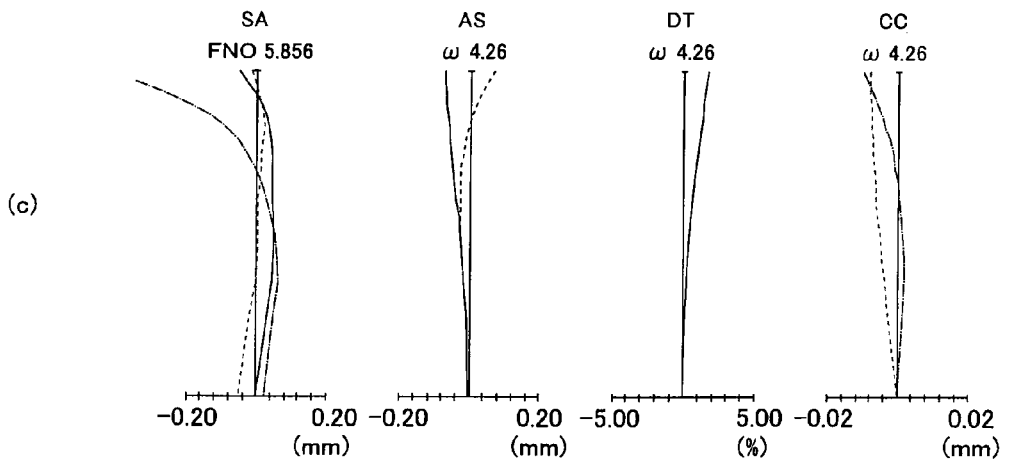
Figure 14:
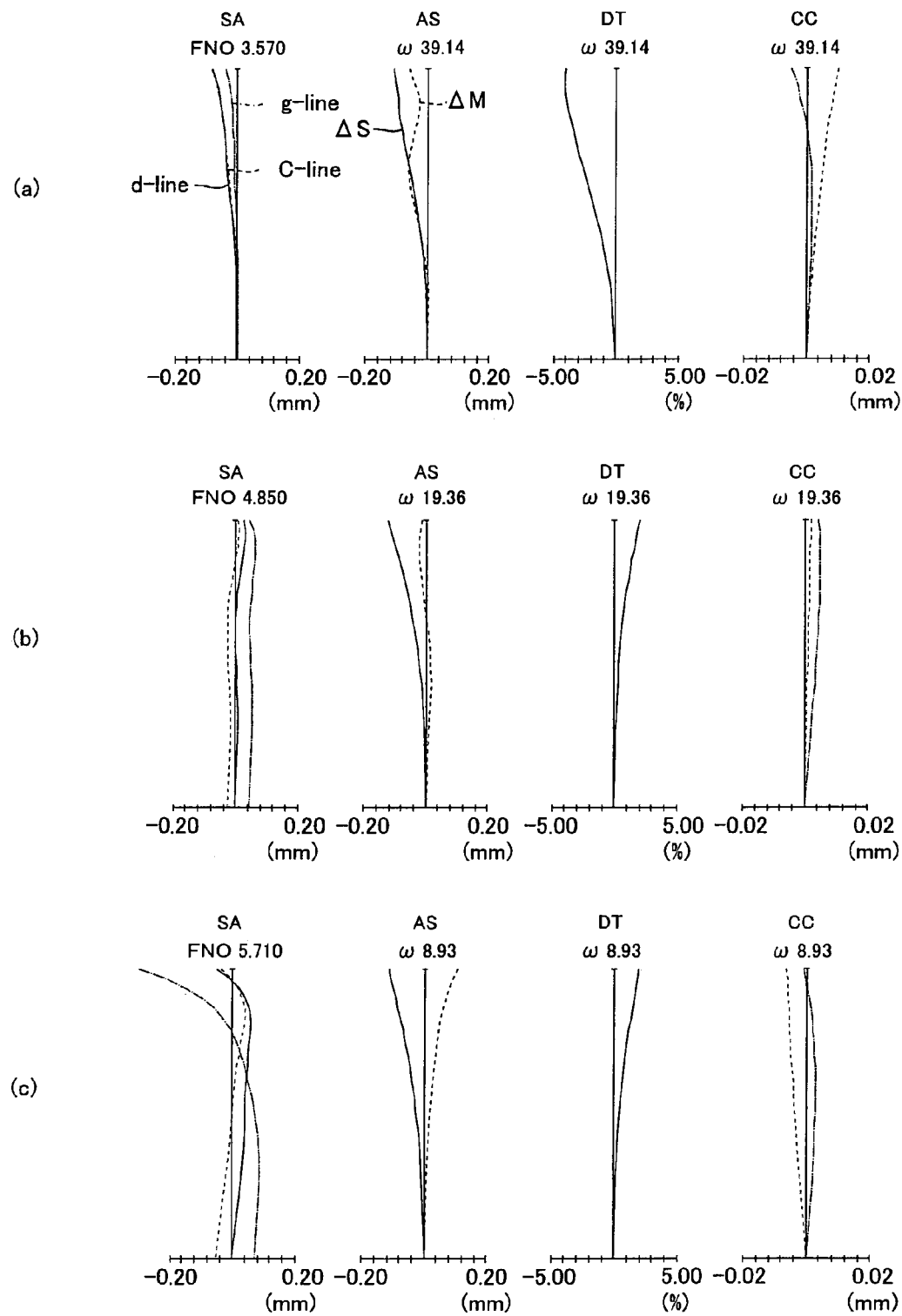
FIG. 14 is a diagram illustrating various types of aberration in an infinite-distance focusing state of the optical system according to the sixth embodiment.
Figure 15:
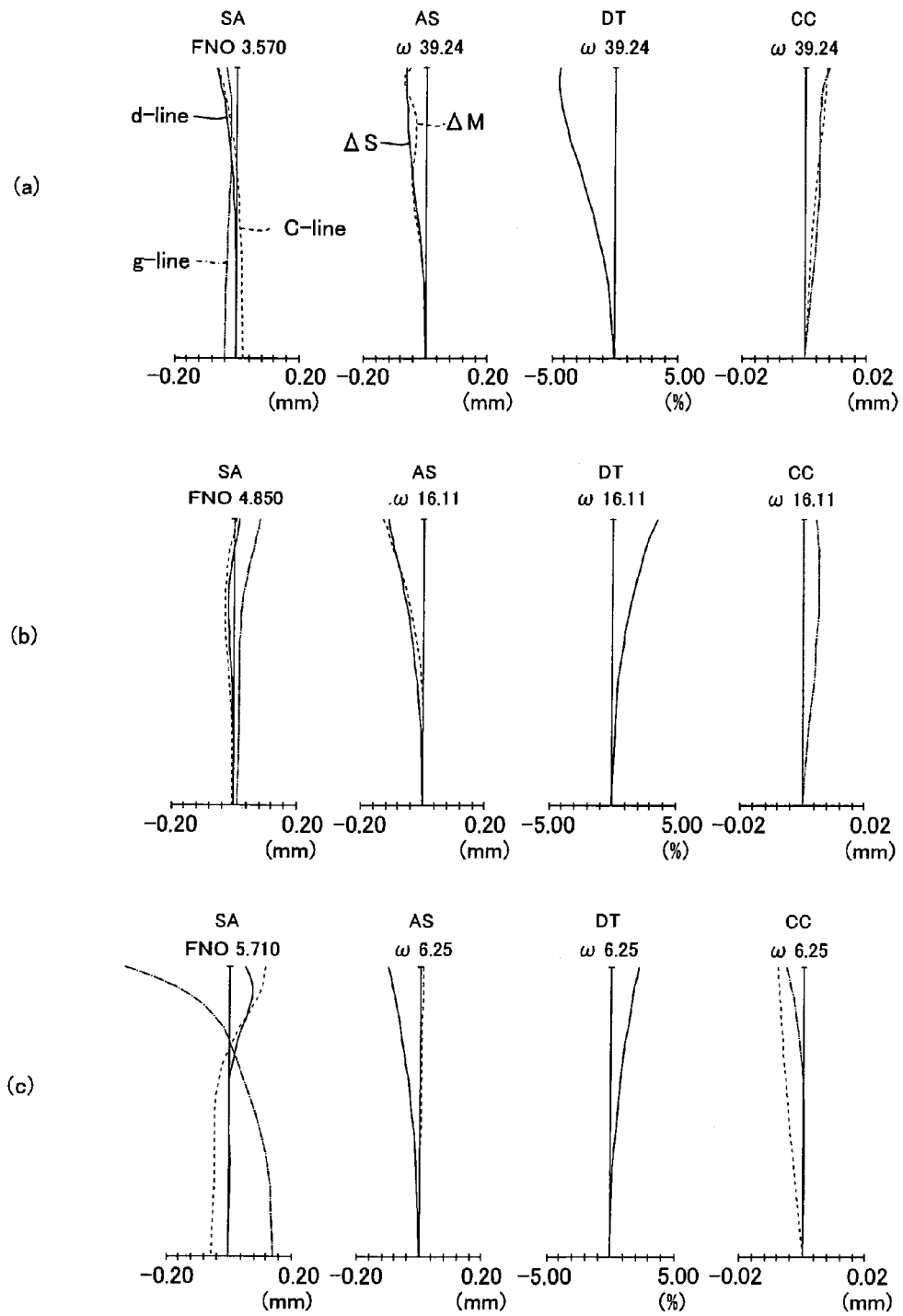
FIG. 15 is a diagram illustrating various types of aberration in an infinite-distance focusing state of the optical system according to the seventh embodiment.
Figure 16:
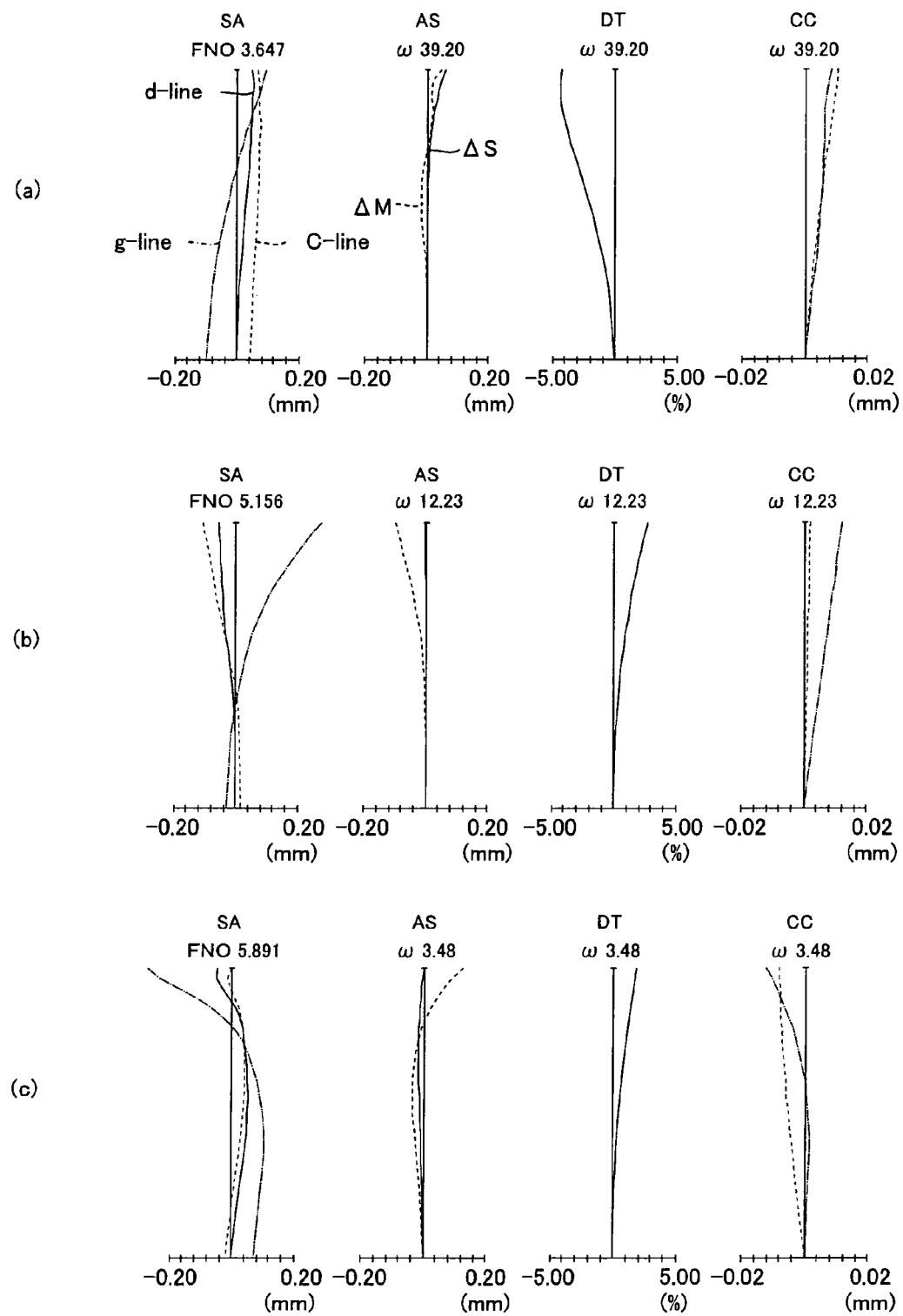
FIG. 16 is a diagram illustrating various types of aberration in an infinite-distance focusing state of the optical system according to the eighth embodiment.

FIG. 8 is a cross-sectional view of a zoom lens of the eighth embodiment.

As shown in FIG. 8, the zoom lens of the eighth embodiment includes, from an object side in the following order, a first lens group G1 having a positive refractive power, a second lens group G2 having a negative refractive power, a third lens group G3 having a positive refractive power, and a fourth lens group G4 having a positive refractive power.

The following describes movements when magnification is changed from the wide angle end to the telephoto end.

The first lens group G1 moves toward the object side, from the wide angle end to the telephoto end.

From the wide angle end to the telephoto end, the second lens group G2 moves toward the object side so as to increase the distance from the first lens group G1 and decrease the distance from the third lens group G3.

From the wide angle end to the telephoto end, the third lens group G3 moves toward the object side so as to decrease the distance from the second lens group G2 and the distance from the fourth lens group G4.

From the wide angle end to the telephoto end, the fourth lens group G4 moves toward the object side so as to decrease the distance from the third lens group G3 and increase the distance from an image surface I.

The following describes movements when magnification is changed from the wide angle end to the telephoto end at a time when OD is equal to 250 mm.

The first lens group G1 moves toward the object side, from the wide angle end to the telephoto end.

From the wide angle end to the telephoto end, the second lens group G2 moves toward the object side so as to increase the distance from the first lens group G1 and decrease the distance from the third lens group G3.

From the wide angle end to the telephoto end, the third lens group G3 moves toward the object side so as to decrease the distance from the second lens group G2 and the distance from the fourth lens group G4.

From the wide angle end to the telephoto end, the fourth lens group G4 moves toward the object side so as to decrease the distance from the third lens group G3 and increase the distance from the image surface I.

The first lens group G1 includes, from the object side in the following order, a negative meniscus lens whose convex surface faces to the object side, a biconvex positive lens, and a positive meniscus lens whose convex surface faces to the object side.

The second lens group G2 includes, from the object side in the following order, a cemented lens having a positive meniscus lens whose convex surface faces to the object side and a negative meniscus lens whose convex surface faces to the object side, a biconcave negative lens, a biconvex positive lens, and a cemented lens having a biconcave negative lens and a biconvex positive lens.

The third lens group G3 includes an aperture diaphragm S, a biconvex positive lens, and a cemented lens having a biconvex positive lens and a biconcave negative lens.

The fourth lens group G4 includes a positive meniscus lens whose convex surface faces to the object side, a biconvex positive lens, and a cemented lens having a biconcave negative lens and a biconvex positive lens.

The reference mark C represents a cover glass, and the reference mark I represents an image surface.

Aspheric surfaces are used for the following four surfaces: the surface that is closest to the object in the object-side cemented lens of the second lens group G2, both surfaces of the biconvex positive lens L41 of the fourth lens group G4, and the surface that is closest to the image in the cemented lens.

Numeric data of the first to eighth embodiments will be shown below. As to the numeric data of the first to eighth embodiments, r represents curvature radius of the lens surface; d represents lens thickness and an air space; and Nd and vd represent a refractive index and Abbe number of the d-line ($\lambda$=587.6 nm). Moreover, W of zoom data represents the wide angle end; WS represents the wide angle to the standard medium; S represents the standard; TS represents the telephoto to the standard medium; and T represents the telephoto end.

On the specification list related to the description of the embodiments, the surfaces indicated by "aspheric surface" are aspheric surfaces. If the coordinate of the optical-axis direction is represented by Z, the coordinate perpendicular to the optical axis by Y, the paraxial curvature radius by r, the constant of the cone by K, and the second-order, fourth-order, sixth-order, eighth-order, and tenth-order aspheric surface coefficients by A2, A4, A6, A8, and A10, respectively, the shape of aspheric surface is represented by the following equation (a):

$$Z=(Y^2/r)/\{1+[1-(1+K)\cdot(Y/r)^2]^{1/2}\}+A4Y^4+A6Y^6+A8Y^8+A10Y^{10} \quad (a)$$

Besides a brightness diaphragm, a flare diaphragm may be disposed to cut unwanted light such as ghost and flare. The flare diaphragm may be disposed at the object side of the first lens group, between the first and second lens groups, between the second and third lens groups, between the third and fourth lens groups, or between the group that is closest to the image surface and the image surface. A frame member may be so formed as to cut the flare optical beam. Other members may be formed. Such a member may be directly printed or painted on optical systems. Such a member may be put on optical systems as seals. Such a member may be shaped in any form, including a circle, an ellipse, a rectangle, a polygon, and an area surrounded by functional curves. Such a member may cut coma flare around a screen and other optical beams, as well as harmful optical beams.

An anti-reflective coating may be applied to each lens to reduce ghosts and flare. A multi coating is desirable because the multi coating can efficiently reduce ghosts and flare. An infrared-cut coating may be applied to lens surfaces, cover glasses and the like.

As shown in each of the numeric data, focus adjustment is performed by moving the second lens group as one unit or moving two sub-units. Alternatively, the focusing to conduct focus adjustment may be performed by the unit that is closest to the image surface. When the focusing is performed by the unit that is closest to the image surface, the burden imposed on a motor is small because of the lightweight lenses. Moreover, the fact that the overall length remains unchanged during focusing and that a driving motor can be disposed inside a lens frame is an advantage in downsizing the lens frame. As described above, it is desirable that focusing is conducted by the unit that is closest to the image surface. However, focusing may be performed by the first, second, third, or fourth lens group. Focusing may be performed by moving a plurality of the lens groups. Moving a plurality of the lens groups can efficiently reduce the decline in performance caused by focusing. Focusing may be performed by rolling out the entire system of lenses. Focusing may be performed by rolling out or rolling back part of the lenses.

A decline in brightness (shading) at the periphery of the image may be reduced by shifting a microlens of CCD. For example, the design of the CCD microlens may be changed in accordance with the incidence angle of an optical beam for the height of each image. Moreover, the amount of decline around the periphery of the image may be corrected by image processing.

A method of applying an anti-reflective coating to a lens surface in contact with the air to prevent ghosts and flare from appearing is commonly used. On the other hand, the refractive index of an adhesive on the joint surface of the cemented lens is sufficiently higher than the air. Therefore, in many cases, it is rare to apply a coating because the refractive index is at almost the same level as or less than that of a single layer coating from the beginning. However, if the anti-reflective coating is also applied to the joint surface, ghosts and flare can be further reduced and high-quality images can be obtained. In particular, the use of high refractive index glass has recently become widespread, and the high refractive index glass is frequently used in cameras' optical systems because the high refractive index glass has a high capability in correcting aberration. However, if the high refractive index glass is used as the cemented lens, it is difficult to disregard the reflection from the joint surface. In such cases, the anti-reflective coating applied to the joint surface is particularly effective.

The methods of effectively using the joint-surface coating are disclosed in JP-A-2-27301, JP-A-2001-324676, JP-A-2005-92115, U.S. Pat. No. 7,116,482, and the like. The documents describe particularly the coating of the cemented lens surfaces in the first lens group of a positive preceding zoom lens. The same thing may be done with the cemented lens surface of the first lens group of the present invention as disclosed in the above documents.

A relatively high refractive index coating material, such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$, or a relatively low refractive index coating material, such as $MgF_2$, $SiO_2$, and $Al_2O_3$, may be appropriately selected for use in accordance with the refractive index of the lens that forms the basis and the refractive index of the adhesive; the thickness of the film is so set as to satisfy phase conditions. As a matter of course, the joint surface coating may be a multi coating, which is applied to the lens's surface in contact with the air. Coating materials that have two layers or more films and are different in film thickness may be appropriately used in combination to further reduce reflectivity, to control spectral characteristics of reflectivity, angular characteristics and the like, and to do other things. It goes without saying that applying the joint surface coating to any lens joint surfaces other than that of the first lens group on the basis of a similar idea is effective.

Numeric Example 1

| | Unit mm | | | |
|---|---|---|---|---|
| | Surface data | | | |
| Surface Number | r | d | nd | vd |
| 1 | 90.618 | 2.65 | 1.85026 | 32.27 |
| 2 | 56.548 | 0.45 | | |
| 3 | 58.731 | 6.50 | 1.49700 | 81.54 |
| 4 | 1683.670 | 0.20 | | |
| 5 | 52.533 | 5.20 | 1.49700 | 81.54 |
| 6 | 273.171 | variable | | |
| 7 (Aspheric) | 90.806 | 0.08 | 1.51940 | 51.94 |
| 8 | 63.573 | 1.40 | 1.88300 | 40.76 |
| 9 | 13.049 | 6.48 | | |
| 10 | −27.461 | 1.05 | 1.60311 | 60.64 |
| 11 | 40.669 | 0.20 | | |
| 12 | 40.595 | 4.20 | 1.68893 | 31.07 |
| 13 | −28.664 | variable | | |
| 14 | −19.208 | 1.00 | 1.69680 | 55.53 |
| 15 | 19.938 | 3.10 | 1.80100 | 34.97 |
| 16 | −132.991 | variable | | |
| 17 (Stop) | ∞ | 1.50 | | |
| 18 | 28.900 | 3.00 | 1.49700 | 81.54 |
| 19 | −83.043 | 0.20 | | |
| 20 | 22.359 | 5.45 | 1.58267 | 46.42 |
| 21 | −22.265 | 1.00 | 1.80610 | 40.92 |
| 22 | 27.235 | variable | | |
| 23 (Aspheric) | 20.229 | 4.79 | 1.49700 | 81.54 |
| 24 (Aspheric) | −31.055 | 0.20 | | |
| 25 | −52.455 | 1.93 | 1.49700 | 81.54 |
| 26 | −33.376 | 0.20 | | |
| 27 | 119.322 | 1.00 | 1.78590 | 44.20 |
| 28 | 12.871 | 4.60 | 1.51633 | 64.14 |
| 29 | 339.930 | variable | | |
| 30 | ∞ | 4.57 | 1.51633 | 64.14 |
| 31 | ∞ | 31.02 | | |
| Image Surface | ∞ | | | |

| Aspheric data |
|---|
| 7 surface |
| $K = -130.000, A4 = 4.52900E-05, A6 = -2.36519E-07,$ $A8 = 9.84174E-10, A10 = -1.91016E-12$ |
| 23 surface |
| $K = -0.858, A4 = -2.86800E-05, A6 = -2.37382E-07,$ $A8 = -7.90089E-11, A10 = 3.47390E-12$ |
| 24 surface |
| $K = 0.000, A4 = -8.53186E-06, A6 = -3.03923E-07,$ $A8 = 1.88936E-09, A10 = -5.94955E-12$ |
| 29 surface |
| $K = 0.000, A4 = 1.96597E-05, A6 = 1.79997E-07,$ $A8 = -3.93620E-09, A10 = 7.29692E-12$ |

| | Zooming data | | | | |
|---|---|---|---|---|---|
| | W | WS | S | TS | T |
| focal length | 14.28 | 25.23 | 45.73 | 82.81 | 147.00 |
| F NUMBER | 3.63 | 3.75 | 4.40 | 5.78 | 5.70 |
| angle of view (°) | 78.89 | 46.66 | 26.74 | 15.12 | 8.58 |
| image height | 11.15 | 11.15 | 11.15 | 11.15 | 11.15 |
| lens total length | 123.69 | 136.82 | 157.59 | 181.25 | 195.00 |
| BF | 34.42 | 45.35 | 57.95 | 77.05 | 77.88 |
| d6 | 1.00 | 14.23 | 29.39 | 39.65 | 55.71 |
| d13 | 2.70 | 2.70 | 2.70 | 2.70 | 2.70 |
| d16 | 21.43 | 9.56 | 5.45 | 4.00 | 1.75 |
| d22 | 7.76 | 5.22 | 3.32 | 1.62 | 1.20 |
| d29 | 0.41 | 11.31 | 23.85 | 43.03 | 43.84 |
| (OD = 400 mm) | | | | | |
| d6 | 1.25 | 14.10 | 28.61 | 38.08 | 51.39 |
| d13 | 1.47 | 1.47 | 1.47 | 1.47 | 1.47 |
| d16 | 22.40 | 10.91 | 7.47 | 6.80 | 7.29 |
| d22 | 7.76 | 5.22 | 3.32 | 1.62 | 1.20 |
| d29 | 0.41 | 11.31 | 23.85 | 43.03 | 43.84 |

| Zoom lens group data | |
|---|---|
| group | starting surface |
| 1 | 1 |
| 2 | 7 |
| 3 | 18 |
| 4 | 23 |

Numeric Example 2

| | Unit mm | | | |
|---|---|---|---|---|
| | Surface data | | | |
| Surface Number | r | d | nd | vd |
| 1 | 66.328 | 2.65 | 1.85026 | 32.27 |
| 2 | 45.436 | 0.25 | | |
| 3 | 45.250 | 7.00 | 1.49700 | 81.54 |
| 4 | 299.800 | 0.20 | | |
| 5 | 63.176 | 4.70 | 1.49700 | 81.54 |
| 6 | 335.857 | variable | | |
| 7 (Aspheric) | 481.667 | 0.08 | 1.51940 | 51.94 |
| 8 | 86.862 | 1.40 | 1.88300 | 40.76 |

-continued

Unit mm

| | | | | |
|---|---|---|---|---|
| 9 | 13.436 | 5.90 | | |
| 10 | −28.537 | 1.05 | 1.69680 | 55.53 |
| 11 | 13.637 | 0.01 | 1.56384 | 60.70 |
| 12 | 13.637 | 6.00 | 1.79504 | 28.57 |
| 13 | −40.799 | 1.89 | | |
| 14 | −15.262 | 1.00 | 1.65844 | 50.88 |
| 15 | −27.963 | variable | | |
| 16 (Stop) | ∞ | 1.51 | | |
| 17 | 30.272 | 3.00 | 1.49700 | 81.54 |
| 18 | −62.692 | 0.20 | | |
| 19 | 34.297 | 4.64 | 1.58313 | 59.38 |
| 20 | −19.038 | 1.00 | 1.80400 | 46.57 |
| 21 | 44.212 | variable | | |
| 22 (Aspheric) | 20.025 | 3.89 | 1.49700 | 81.54 |
| 23 (Aspheric) | −60.938 | 1.50 | | |
| 24 | −65.716 | 2.84 | 1.51633 | 64.14 |
| 25 | −31.116 | 0.27 | | |
| 26 | 90.045 | 1.00 | 1.78800 | 47.37 |
| 27 | 12.216 | 5.50 | 1.51633 | 64.14 |
| 28 | −234.323 | variable | | |
| 29 | ∞ | 4.57 | 1.51633 | 64.14 |
| 30 | ∞ | 31.02 | | |
| Image Surface | ∞ | | | |

Aspheric data 7 surface

K = −8.762, A4 = 3.71514E−05, A6 = −1.08617E−07,
A8 = 4.69314E−10, A10 = −5.72623E−13

22 surface

K = −0.419, A4 = −2.44119E−05, A6 = −1.87312E−07,
A8 = 1.09982E−09, A10 = −3.00750E−12

23 surface

K = 0.860, A4 = −1.09348E−05, A6 = −1.78033E−07,
A8 = 1.65893E−09, A10 = −4.96813E−12

28 surface

K = 214.764, A4 = 2.20719E−05, A6 = 4.36036E−09,
A8 = −5.94779E−10, A10 = −7.55665E−12

Zooming data

| | W | WS | S | TS | T |
|---|---|---|---|---|---|
| focal length | 14.28 | 25.23 | 45.93 | 82.81 | 147.00 |
| F NUMBER | 3.64 | 3.88 | 4.32 | 5.65 | 5.77 |
| angle of view (°) | 78.90 | 46.91 | 26.71 | 15.14 | 8.57 |
| image height | 11.15 | 11.15 | 11.15 | 11.15 | 11.15 |
| lens total length | 125.59 | 136.91 | 157.01 | 180.15 | 195.22 |
| BF | 34.37 | 45.03 | 57.66 | 76.60 | 78.75 |
| d6 | 1.50 | 15.00 | 30.37 | 40.68 | 56.89 |
| d15 | 20.87 | 10.27 | 4.22 | 2.87 | 1.75 |
| d21 | 11.38 | 6.79 | 3.86 | 1.57 | 1.00 |
| d28 | 0.34 | 10.99 | 23.61 | 42.57 | 44.72 |
| (OD = 400 mm) | | | | | |
| d6 | 0.70 | 13.87 | 28.59 | 38.11 | 51.70 |
| d15 | 21.66 | 11.40 | 5.99 | 5.45 | 6.93 |
| d21 | 11.38 | 6.79 | 3.86 | 1.57 | 1.00 |
| d28 | 0.34 | 10.99 | 23.61 | 42.57 | 44.72 |

Zoom lens group data

| group | starting surface |
|---|---|
| 1 | 1 |
| 2 | 7 |
| 3 | 17 |
| 4 | 22 |

Numeric Example 3

Unit mm

Surface data

| Surface Number | r | d | nd | vd |
|---|---|---|---|---|
| 1 | 102.239 | 2.65 | 1.85026 | 32.27 |
| 2 | 60.469 | 0.44 | | |
| 3 | 62.839 | 6.30 | 1.49700 | 81.54 |
| 4 | −5475.194 | 0.20 | | |
| 5 | 53.620 | 5.40 | 1.49700 | 81.54 |
| 6 | 291.069 | variable | | |
| 7 (Aspheric) | 2010.515 | 0.08 | 1.51940 | 51.94 |
| 8 | 100.887 | 1.40 | 1.88300 | 40.76 |
| 9 | 13.434 | 5.90 | | |
| 10 | −28.783 | 1.05 | 1.69680 | 55.53 |
| 11 | 13.498 | 0.01 | 1.56384 | 60.70 |
| 12 | 13.498 | 6.00 | 1.79504 | 28.57 |
| 13 | −39.705 | 1.87 | | |
| 14 | −15.375 | 1.00 | 1.67790 | 50.72 |
| 15 | −27.190 | variable | | |
| 16 (Stop) | ∞ | 1.94 | | |
| 17 | 28.982 | 3.10 | 1.49700 | 81.54 |
| 18 | −66.731 | 0.20 | | |
| 19 | 35.615 | 4.67 | 1.58313 | 59.38 |
| 20 | −18.545 | 1.00 | 1.80400 | 46.57 |
| 21 | 43.986 | variable | | |
| 22 (Aspheric) | 19.530 | 4.10 | 1.49700 | 81.54 |
| 23 (Aspheric) | −48.815 | 2.10 | | |
| 24 | −50.523 | 1.69 | 1.51633 | 64.14 |
| 25 | −30.895 | 0.22 | | |
| 26 | 88.144 | 1.00 | 1.78800 | 47.37 |
| 27 | 12.117 | 5.50 | 1.51633 | 64.14 |
| 28 (Aspheric) | −260.135 | variable | | |
| 29 | ∞ | 4.57 | 1.51633 | 64.14 |
| 30 | ∞ | 31.02 | | |
| Image Surface | ∞ | | | |

Aspheric data 7 surface

K = −99.589, A4 = 3.84229E−05, A6 = −1.00234E−07,
A8 = 3.42734E−10, A10 = −3.08633E−13

22 surface

K = −0.410, A4 = −2.51348E−05, A6 = −1.87930E−07,
A8 = 1.09632E−09, A10 = −2.41077E−12

23 surface

K = 0.921, A4 = −1.09550E−05, A6 = −1.77210E−07,
A8 = 1.69378E−09, A10 = −4.47773E−12

28 surface

K = 13.187, A4 = 2.29188E−05, A6 = 7.74416E−09,
A8 = −7.09982E−10, A10 = −7.88007E−12

Zooming data

| | W | WS | S | TS | T |
|---|---|---|---|---|---|
| focal length | 14.28 | 25.23 | 45.89 | 82.81 | 147.00 |
| F NUMBER | 3.64 | 3.94 | 4.36 | 5.54 | 5.77 |
| angle of view (°) | 78.73 | 46.82 | 26.70 | 15.13 | 8.57 |
| image height | 11.15 | 11.15 | 11.15 | 11.15 | 11.15 |
| lens total length | 125.72 | 137.51 | 158.11 | 181.25 | 196.35 |
| BF | 34.68 | 45.39 | 57.81 | 75.74 | 78.15 |
| d6 | 1.98 | 15.69 | 31.57 | 42.70 | 58.71 |
| d15 | 19.82 | 10.05 | 4.00 | 2.34 | 1.75 |
| d21 | 11.42 | 6.73 | 3.74 | 1.53 | 1.00 |
| d28 | 0.68 | 11.36 | 23.77 | 41.71 | 44.12 |
| (OD = 400 mm) | | | | | |
| d6 | 1.30 | 14.58 | 29.80 | 40.06 | 53.44 |
| d15 | 20.53 | 11.15 | 5.77 | 4.98 | 7.02 |

| | | Unit mm | | | |
|---|---|---|---|---|---|
| d21 | 11.42 | 6.73 | 3.74 | 1.53 | 1.00 |
| d28 | 0.68 | 11.36 | 23.77 | 41.71 | 44.12 |

Zoom lens group data

| group | starting surface |
|---|---|
| 1 | 1 |
| 2 | 7 |
| 3 | 17 |
| 4 | 22 |

Numeric Example 4

Unit mm

Surface data

| Surface Number | r | d | nd | νd |
|---|---|---|---|---|
| 1 | 88.806 | 2.10 | 1.85026 | 32.27 |
| 2 | 55.537 | 0.22 | | |
| 3 | 55.183 | 6.59 | 1.49700 | 81.54 |
| 4 | 2593.257 | 0.20 | | |
| 5 | 58.191 | 4.60 | 1.49700 | 81.54 |
| 6 | 265.264 | variable | | |
| 7 (Aspheric) | 87.495 | 0.08 | 1.51940 | 51.94 |
| 8 | 55.711 | 1.40 | 1.88300 | 40.76 |
| 9 | 13.219 | 6.88 | | |
| 10 | −26.006 | 1.00 | 1.60311 | 60.64 |
| 11 | 47.990 | 0.20 | | |
| 12 | 39.321 | 3.94 | 1.68893 | 31.07 |
| 13 | −25.470 | variable | | |
| 14 | −17.538 | 1.00 | 1.69680 | 55.53 |
| 15 | 20.538 | 3.30 | 1.80100 | 34.97 |
| 16 | −177.108 | variable | | |
| 17 (Stop) | ∞ | 2.51 | | |
| 18 | 29.528 | 3.30 | 1.49700 | 81.54 |
| 19 | −53.401 | 0.20 | | |
| 20 | 26.783 | 4.90 | 1.58267 | 46.42 |
| 21 | −21.738 | 1.00 | 1.80610 | 40.92 |
| 22 | 30.903 | variable | | |
| 23 (Aspheric) | 16.415 | 4.10 | 1.49700 | 81.54 |
| 24 (Aspheric) | 946.366 | 0.20 | | |
| 25 | 63.794 | 2.20 | 1.51633 | 64.14 |
| 26 | −106.816 | 0.37 | | |
| 27 | −215.224 | 1.00 | 1.79952 | 42.22 |
| 28 | 17.756 | 4.45 | 1.51633 | 64.14 |
| 29 | −82.977 | variable | | |
| 30 | ∞ | 4.57 | 1.51633 | 64.14 |
| 31 | ∞ | 31.02 | | |
| Image Surface | ∞ | | | |

Aspheric data 7 surface

K = −57.339, A4 = 3.31527E−05, A6 = −9.83234E−08,
A8 = 2.94267E−10, A10 = −4.33040E−13

23 surface

K = −0.070, A4 = −1.59829E−05, A6 = −1.03495E−07,
A8 = −9.05368E−10, A10 = 8.87364E−12

24 surface

K = −18595.299, A4 = −3.05742E−05, A6 = −4.23559E−07,
A8 = 2.62174E−09, A10 = 5.67797E−13

29 surface

K = −101.899, A4 = 5.71762E−05, A6 = 7.60246E−07,
A8 = −3.41864E−09, A10 = 9.32200E−12

Zooming data

| | W | WS | S | TS | T |
|---|---|---|---|---|---|
| focal length | 14.28 | 25.23 | 45.93 | 83.01 | 147.00 |
| F NUMBER | 3.64 | 4.27 | 5.29 | 5.53 | 5.77 |
| angle of view (°) | 78.57 | 46.68 | 26.73 | 14.99 | 8.54 |
| image height | 11.15 | 11.15 | 11.15 | 11.15 | 11.15 |
| lens total length | 123.68 | 135.01 | 154.77 | 179.04 | 195.65 |
| BF | 34.68 | 46.23 | 63.37 | 70.41 | 77.95 |
| d6 | 1.00 | 13.52 | 24.91 | 45.69 | 58.58 |
| d13 | 2.03 | 2.03 | 2.03 | 2.03 | 2.03 |
| d16 | 19.91 | 12.51 | 7.22 | 4.81 | 1.76 |
| d22 | 10.31 | 6.18 | 2.84 | 1.84 | 1.20 |
| d29 | 0.65 | 12.20 | 29.34 | 36.37 | 43.92 |
| (OD = 350 mm) | | | | | |
| d6 | 0.56 | 12.76 | 23.68 | 42.90 | 53.42 |
| d13 | 1.50 | 1.50 | 1.50 | 1.50 | 1.50 |
| d16 | 20.88 | 13.81 | 8.99 | 8.13 | 7.45 |
| d22 | 10.31 | 6.18 | 2.84 | 1.84 | 1.20 |
| d29 | 0.65 | 12.20 | 29.34 | 36.37 | 43.92 |

Zoom lens group data

| group | starting surface |
|---|---|
| 1 | 1 |
| 2 | 7 |
| 3 | 18 |
| 4 | 23 |

Numeric Example 5

Unit mm

Surface data

| Surface Number | r | d | nd | νd |
|---|---|---|---|---|
| 1 | 67.827 | 1.55 | 1.85026 | 32.35 |
| 2 | 50.005 | 0.15 | | |
| 3 | 49.486 | 7.90 | 1.43875 | 94.93 |
| 4 | 2503.136 | 0.15 | | |
| 5 | 63.417 | 4.20 | 1.49700 | 81.54 |
| 6 | 202.259 | variable | | |
| 7 (Aspheric) | 88.406 | 0.08 | 1.51940 | 51.94 |
| 8 | 68.288 | 1.40 | 1.88300 | 40.76 |
| 9 | 12.046 | 6.89 | | |
| 10 | −22.888 | 1.20 | 1.43875 | 94.93 |
| 11 | 20.618 | 0.10 | | |
| 12 | 19.429 | 5.00 | 1.63980 | 34.46 |
| 13 | −41.580 | variable | | |
| 14 | −20.885 | 1.30 | 1.69680 | 55.53 |
| 15 | 1358.863 | 1.45 | 1.75211 | 25.05 |
| 16 | −67.178 | variable | | |
| 17 (Stop) | ∞ | 1.52 | | |
| 18 | 32.147 | 3.40 | 1.49650 | 81.53 |
| 19 | −38.977 | 0.15 | | |
| 20 | 25.200 | 4.70 | 1.51742 | 52.43 |
| 21 | −23.274 | 1.00 | 1.81600 | 46.62 |
| 22 | 37.095 | variable | | |
| 23 (Aspheric) | 16.864 | 3.60 | 1.49650 | 81.53 |
| 24 (Aspheric) | 137.532 | 0.15 | | |
| 25 | 47.710 | 2.70 | 1.53172 | 48.84 |
| 26 | −171.062 | 0.15 | | |
| 27 | −1597.028 | 1.10 | 1.88300 | 40.76 |

-continued

Unit mm

| | | | | |
|---|---|---|---|---|
| 28 | 17.549 | 5.70 | 1.49650 | 81.53 |
| 29 (Aspheric) | −61.762 | variable | | |
| 30 | ∞ | 4.57 | 1.51633 | 64.14 |
| 31 | ∞ | 31.02 | | |
| Image Surface | ∞ | | | |

Aspheric data 7 surface

K = −92.354, A4 = 4.21545E−05, A6 = −1.26291E−07, A8 = 3.13014E−10, A10 = −4.66794E−13

23 surface

K = 0.105, A4 = −1.30987E−05, A6 = −8.36294E−08, A8 = −1.40926E−10, A10 = 3.72496E−12

24 surface

K = −189.705, A4 = −1.64354E−05, A6 = −2.96768E−07, A8 = 1.54547E−09, A10 = 1.88779E−12

29 surface

K = −85.536, A4 = 3.16927E−05, A6 = 8.39061E−07, A8 = −2.83567E−09, A10 = 1.48768E−11

Zooming data

| | W | WS | S | TS | T |
|---|---|---|---|---|---|
| focal length | 14.28 | 25.25 | 45.74 | 83.01 | 147.00 |
| F NUMBER | 3.65 | 4.59 | 5.16 | 5.62 | 5.86 |
| angle of view (°) | 77.91 | 47.15 | 26.79 | 14.97 | 8.53 |
| image height | 11.15 | 11.15 | 11.15 | 11.15 | 11.15 |
| lens total length | 124.22 | 131.58 | 155.04 | 179.61 | 197.16 |
| BF | 34.13 | 47.67 | 61.88 | 68.70 | 77.82 |
| d6 | 0.70 | 9.57 | 26.07 | 47.13 | 59.32 |
| d13 | 3.46 | 3.46 | 3.46 | 3.46 | 3.46 |
| d16 | 21.69 | 12.03 | 7.18 | 4.38 | 0.90 |
| d22 | 8.69 | 3.30 | 0.89 | 0.38 | 0.10 |
| d29 | 0.10 | 13.63 | 27.85 | 34.67 | 43.79 |
| (OD = 250 mm) | | | | | |
| d6 | 1.11 | 9.69 | 25.31 | 44.46 | 54.24 |
| d13 | 0.83 | 0.83 | 0.83 | 0.83 | 0.83 |
| d16 | 23.92 | 14.55 | 10.59 | 9.68 | 8.62 |
| d22 | 8.69 | 3.30 | 0.89 | 0.38 | 0.10 |
| d29 | 0.10 | 13.63 | 27.85 | 34.67 | 43.79 |

Zoom lens group data

| group | starting surface |
|---|---|
| 1 | 1 |
| 2 | 7 |
| 3 | 18 |
| 4 | 23 |

Numeric Example 6

Unit mm

Surface data

| Surface Number | r | d | nd | vd |
|---|---|---|---|---|
| 1 | 87.147 | 1.55 | 1.84666 | 23.78 |
| 2 | 56.997 | 5.60 | 1.49700 | 81.54 |
| 3 | −349.532 | 0.15 | | |
| 4 | 37.139 | 3.30 | 1.58913 | 61.14 |
| 5 | 67.345 | variable | | |
| 6 (Aspheric) | 82.089 | 0.08 | 1.51940 | 51.94 |
| 7 | 48.072 | 1.40 | 1.88300 | 40.76 |

-continued

Unit mm

| | | | | |
|---|---|---|---|---|
| 8 | 10.155 | 5.64 | | |
| 9 | −27.770 | 1.20 | 1.61800 | 63.33 |
| 10 | 15.804 | 0.10 | | |
| 11 | 15.247 | 4.40 | 1.75520 | 27.51 |
| 12 | −54.632 | variable | | |
| 13 | −18.460 | 1.40 | 1.69680 | 55.53 |
| 14 | −29.236 | variable | | |
| 15 (Stop) | ∞ | 0.90 | | |
| 16 | 26.843 | 2.75 | 1.49650 | 81.53 |
| 17 | −166.370 | 0.15 | | |
| 18 | 16.735 | 4.32 | 1.51742 | 52.43 |
| 19 | −31.564 | 1.00 | 1.81600 | 46.62 |
| 20 | 19.818 | variable | | |
| 21 (Aspheric) | 12.969 | 4.10 | 1.49650 | 81.53 |
| 22 (Aspheric) | −83.449 | 0.30 | | |
| 23 | 61.229 | 1.10 | 1.88300 | 40.76 |
| 24 | 15.215 | 4.96 | 1.49650 | 81.53 |
| 25 (Aspheric) | −44.953 | variable | | |
| 26 | ∞ | 4.57 | 1.51633 | 64.14 |
| 27 | ∞ | 31.02 | | |
| Image Surface | ∞ | | | |

Aspheric data 6 surface

K = −98.366, A4 = 6.37486E−05, A6 = −3.48624E−07, A8 = 1.54178E−09, A10 = −3.77516E−12

21 surface

K = 0.194, A4 = −3.04099E−05, A6 = −3.20430E−07, A8 = 3.56484E−09, A10 = −5.12651E−11

22 surface

K = −228.649, A4 = −5.28238E−05, A6 = 1.43724E−07, A8 = −2.84891E−09, A10 = 6.56621E−12

25 surface

K = −70.088, A4 = 7.71053E−06, A6 = 2.20903E−06, A8 = −1.38756E−08, A10 = 1.63404E−10

Zooming data

| | W | WS | S | TS | T |
|---|---|---|---|---|---|
| focal length | 14.28 | 20.63 | 31.10 | 46.51 | 69.60 |
| F NUMBER | 3.57 | 4.10 | 4.85 | 5.23 | 5.71 |
| angle of view (°) | 78.29 | 56.31 | 38.71 | 26.35 | 17.86 |
| image height | 11.15 | 11.15 | 11.15 | 11.15 | 11.15 |
| lens total length | 101.76 | 108.20 | 118.68 | 132.33 | 144.08 |
| BF | 34.13 | 40.54 | 48.99 | 52.99 | 59.64 |
| D5 | 0.41 | 6.74 | 13.97 | 26.22 | 34.23 |
| d12 | 3.13 | 3.13 | 3.13 | 3.13 | 3.13 |
| d14 | 13.69 | 9.14 | 6.03 | 4.61 | 2.31 |
| d20 | 5.99 | 4.23 | 2.15 | 0.97 | 0.35 |
| d25 | 0.10 | 6.51 | 14.95 | 18.95 | 25.61 |
| (OD = 250 mm) | | | | | |
| D5 | 0.12 | 6.19 | 12.99 | 24.20 | 31.03 |
| d12 | 1.04 | 1.04 | 1.04 | 1.04 | 1.04 |
| d14 | 16.08 | 11.78 | 9.10 | 8.72 | 7.61 |
| d20 | 5.99 | 4.23 | 2.15 | 0.97 | 0.35 |
| d25 | 0.10 | 6.51 | 14.95 | 18.95 | 25.61 |

Zoom lens group data

| group | starting surface |
|---|---|
| 1 | 1 |
| 2 | 7 |
| 3 | 18 |
| 4 | 23 |

Numeric Example 7

Unit mm

Surface data

| Surface Number | r | d | nd | vd |
|---|---|---|---|---|
| 1 | 107.197 | 1.55 | 1.84666 | 23.78 |
| 2 | 68.174 | 5.40 | 1.49700 | 81.54 |
| 3 | −279.231 | 0.15 | | |
| 4 | 48.275 | 2.95 | 1.58913 | 61.14 |
| 5 | 94.452 | variable | | |
| 6 (Aspheric) | 72.971 | 0.08 | 1.51940 | 51.94 |
| 7 | 54.978 | 1.40 | 1.88300 | 40.76 |
| 8 | 11.855 | 7.11 | | |
| 9 | −22.670 | 1.20 | 1.49700 | 81.54 |
| 10 | 18.916 | 0.10 | | |
| 11 | 18.809 | 4.41 | 1.74077 | 27.79 |
| 12 | −47.377 | variable | | |
| 13 | −20.952 | 1.40 | 1.70000 | 48.08 |
| 14 | −64.362 | variable | | |
| 15 (Stop) | ∞ | 0.90 | | |
| 16 | 50.786 | 3.00 | 1.49700 | 81.54 |
| 17 | −42.336 | 0.15 | | |
| 18 | 21.946 | 4.21 | 1.54072 | 47.23 |
| 19 | −24.776 | 1.00 | 1.83481 | 42.71 |
| 20 | 37.044 | variable | | |
| 21 (Aspheric) | 15.220 | 3.90 | 1.49650 | 81.53 |
| 22 (Aspheric) | 205.521 | 0.15 | | |
| 23 | 60.192 | 1.90 | 1.48749 | 70.23 |
| 24 | −238.317 | 0.15 | | |
| 25 | 167.528 | 1.10 | 1.88300 | 40.76 |
| 26 | 18.019 | 5.50 | 1.49650 | 81.53 |
| 27 (Aspheric) | −59.022 | variable | | |
| 28 | ∞ | 4.57 | 1.51633 | 64.14 |
| 29 | ∞ | 31.02 | | |
| Image Surface | ∞ | | | |

Aspheric data 6 surface

K = −98.366, A4 = 5.62842E−05, A6 = −2.58320E−07,
A8 = 1.00041E−09, A10 = −2.03832E−12

21 surface

K = 0.194, A4 = −1.26731E−05, A6 = −1.56138E−07,
A8 = −3.37425E−10, A10 = 4.17103E−12

22 surface

K = −228.649, A4 = −1.46885E−05, A6 = −4.19771E−07,
A8 = 1.94550E−09, A10 = 5.22059E−12

2 surface

K = −70.088, A4 = 5.30836E−05, A6 = 1.05694E−06,
A8 = −2.15991E−09, A10 = 2.63798E−11

Zooming data

| | W | WS | S | TS | T |
|---|---|---|---|---|---|
| focal length | 14.28 | 22.96 | 37.32 | 61.27 | 99.60 |
| F NUMBER | 3.57 | 4.10 | 4.85 | 5.23 | 5.71 |
| angle of view (°) | 78.48 | 50.46 | 32.21 | 20.11 | 12.51 |
| image height | 11.15 | 11.15 | 11.15 | 11.15 | 11.15 |
| lens total length | 110.06 | 120.05 | 135.04 | 153.18 | 170.99 |
| BF | 34.18 | 42.42 | 52.49 | 64.03 | 73.48 |
| d5 | 0.15 | 11.16 | 22.41 | 33.56 | 44.89 |
| d12 | 3.30 | 3.30 | 3.30 | 3.30 | 3.30 |
| d14 | 17.72 | 11.49 | 7.27 | 4.17 | 1.48 |
| d20 | 7.00 | 3.97 | 1.86 | 0.41 | 0.13 |
| d27 | 0.15 | 8.38 | 18.46 | 30.00 | 39.45 |
| (OD = 250 mm) | | | | | |
| d5 | 0.68 | 11.23 | 21.84 | 32.03 | 41.79 |
| d12 | 0.82 | 0.82 | 0.82 | 0.82 | 0.82 |
| d14 | 19.72 | 13.89 | 10.30 | 8.17 | 7.05 |
| d20 | 7.00 | 3.97 | 1.86 | 0.41 | 0.13 |
| d27 | 0.15 | 8.38 | 18.46 | 30.00 | 39.45 |

Zoom lens group data

| group | starting surface |
|---|---|
| 1 | 1 |
| 2 | 6 |
| 3 | 16 |
| 4 | 21 |

Numeric Example 8

Unit mm

Surface data

| Surface Number | r | d | nd | vd |
|---|---|---|---|---|
| 1 | 75.928 | 1.55 | 1.85026 | 32.27 |
| 2 | 53.250 | 0.15 | | |
| 3 | 52.545 | 8.00 | 1.43875 | 94.93 |
| 4 | −593.994 | 0.15 | | |
| 5 | 61.008 | 4.30 | 1.49700 | 81.54 |
| 6 | 195.019 | variable | | |
| 7 (Aspheric) | 62.480 | 0.08 | 1.51940 | 51.94 |
| 8 | 68.588 | 1.40 | 1.88300 | 40.76 |
| 9 | 13.115 | 6.20 | | |
| 10 | −43.456 | 1.20 | 1.59201 | 67.02 |
| 11 | 17.953 | 0.17 | | |
| 12 | 18.433 | 4.50 | 1.68893 | 31.07 |
| 13 | −75.648 | variable | | |
| 14 | −20.745 | 1.30 | 1.69680 | 55.53 |
| 15 | 21.925 | 2.75 | 1.80100 | 34.97 |
| 16 | −147.418 | variable | | |
| 17 (Stop) | ∞ | 1.41 | | |
| 18 | 32.197 | 3.40 | 1.49700 | 81.54 |
| 19 | −48.659 | 0.15 | | |
| 20 | 24.688 | 5.10 | 1.58267 | 46.42 |
| 21 | −22.064 | 1.00 | 1.80610 | 40.92 |
| 22 | 33.231 | variable | | |
| 23 (Aspheric) | 16.483 | 3.80 | 1.49700 | 81.54 |
| 24 (Aspheric) | 138.428 | 0.15 | | |
| 25 | 52.558 | 2.40 | 1.51633 | 64.14 |
| 26 | −86.807 | 0.15 | | |
| 27 | −126.753 | 1.10 | 1.79952 | 42.22 |
| 28 | 16.842 | 4.90 | 1.51633 | 64.14 |
| 29 (Aspheric) | −80.871 | variable | | |
| 30 | ∞ | 4.57 | 1.51633 | 64.14 |
| 31 | ∞ | 31.02 | | |
| Image Surface | ∞ | | | |

Aspheric data 7 surface

K = −61.336, A4 = 4.39741E−05, A6 = −1.88765E−07,
A8 = 6.33712E−10, A10 = −1.12638E−12

23 surface

K = 0.026, A4 = −1.19607E−05, A6 = −3.20580E−08,
A8 = −3.16624E−10, A10 = 8.98739E−12

24 surface

K = −249.337, A4 = −2.01300E−05, A6 = −3.24072E−07,
A8 = 2.27139E−09, A10 = 1.47374E−12

29 surface

K = −127.935, A4 = 5.54887E−05, A6 = 7.74653E−07,
A8 = −3.35567E−09, A10 = 3.33225E−11

-continued

Unit mm

Zooming data

|  | W | WS | S | TS | T |
|---|---|---|---|---|---|
| focal length | 14.28 | 26.61 | 50.10 | 94.99 | 180.00 |
| F NUMBER | 3.65 | 4.59 | 5.16 | 5.62 | 5.89 |
| angle of view (°) | 78.40 | 44.88 | 24.45 | 13.08 | 6.97 |
| image height | 11.15 | 11.15 | 11.15 | 11.15 | 11.15 |
| lens total length | 123.56 | 133.80 | 160.45 | 185.62 | 203.69 |
| BF | 34.58 | 50.08 | 65.87 | 74.28 | 84.03 |
| d6 | 0.10 | 9.71 | 27.16 | 47.52 | 59.98 |
| d13 | 3.18 | 3.18 | 3.18 | 3.18 | 3.18 |
| d16 | 21.48 | 11.98 | 7.46 | 4.70 | 1.10 |
| d22 | 8.90 | 3.55 | 1.48 | 0.64 | 0.10 |
| d29 | 0.56 | 16.05 | 31.84 | 40.24 | 50.00 |
| (OD = 250 mm) | | | | | |
| d6 | 0.10 | 9.38 | 25.88 | 44.32 | 53.96 |
| d13 | 1.25 | 1.25 | 1.25 | 1.25 | 1.25 |
| d16 | 23.41 | 14.24 | 10.66 | 9.84 | 9.05 |
| d22 | 8.90 | 3.55 | 1.48 | 0.64 | 0.10 |
| d29 | 0.56 | 16.05 | 31.84 | 40.24 | 50.00 |

Zoom lens group data

| group | starting surface |
|---|---|
| 1 | 1 |
| 2 | 7 |
| 3 | 18 |
| 4 | 23 |

FIGS. 9 to 16 are diagrams illustrating various types of aberration in an infinite-distance focusing state of (a) wide angle end (W_INF), (b) intermediate state (S_INF), and (c) telephoto end (T_INF) of the optical systems of the first to eighth embodiments. SA represents spherical aberration, AS represents astigmatism, DT represents distortion, and CC represents chromatic aberration of magnification. As for spherical aberration and chromatic aberration of magnification, numbers are shown at each of the following wavelengths: 587.6 nm (d-line: Solid lines), 435.8 nm (g-line: Alternate one long and one short dash lines), and 656.3 nm (C-line: Dotted lines). As for astigmatism, the solid lines represent the sagittal image surfaces, and the dotted lines represent the meridional image surfaces. Incidentally, FNO represents an F-number, and ω represents a half angle of view.

The following shows the numbers of the conditional expressions (1) to (9) according to each of the above-described embodiments. Incidentally, in the conditional expression (4), Vd1pi is the Abbe number of the ith positive lens from the object side in the first lens group.

| Cond. Exp. | 1st Emb. | 2nd Emb. | 3rd Emb. | 4th Emb. |
|---|---|---|---|---|
| (1) | 6.8914 | 7.1265 | 7.1230 | 7.1969 |
| (2) | 0.7584 | 0.5893 | 0.6141 | 0.7627 |
| (3) | 8.3399 | 8.4738 | 8.4106 | 8.5936 |
| (4) (Vd1p1) | 81.54 | 81.54 | 81.54 | 81.54 |
| (4) (Vd1p2) | 81.54 | 81.54 | 81.54 | 81.54 |
| (5) | 0.8263 | 0.8410 | 0.8469 | 0.8375 |
| (6) | 0.4851 | 0.4736 | 0.4805 | 0.4896 |
| (7) | 1.7912 | 1.9428 | 2.0681 | 1.6895 |
| (8) | 0.4596 | 0.7270 | 0.7297 | 0.6380 |
| (9) | −0.1939 | 0.3533 | 0.3615 | −0.2971 |

| Cond. Exp. | 5th Emb. | 6th Emb. | 7th Emb. | 8th Emb. |
|---|---|---|---|---|
| (1) | 7.3001 | 5.6706 | 6.6020 | 7.0755 |
| (2) | 0.6903 | 0.7867 | 0.6590 | 0.7720 |
| (3) | 8.7488 | 7.0688 | 8.0088 | 8.9505 |
| (4) (Vd1p1) | 94.93 | 81.54 | 81.54 | 94.93 |
| (4) (Vd1p2) | 81.54 | 61.14 | 61.14 | 81.54 |
| (5) | 0.8344 | 0.8022 | 0.8243 | 0.7905 |
| (6) | 0.4962 | 0.6081 | 0.6117 | 0.4452 |
| (7) | 1.3457 | 3.9837 | 1.9706 | 1.2728 |
| (8) | 0.6012 | 0.3945 | 0.4817 | 0.6165 |
| (9) | 0.0522 | 0.2746 | 0.0903 | 0.4153 |

Figure 17:
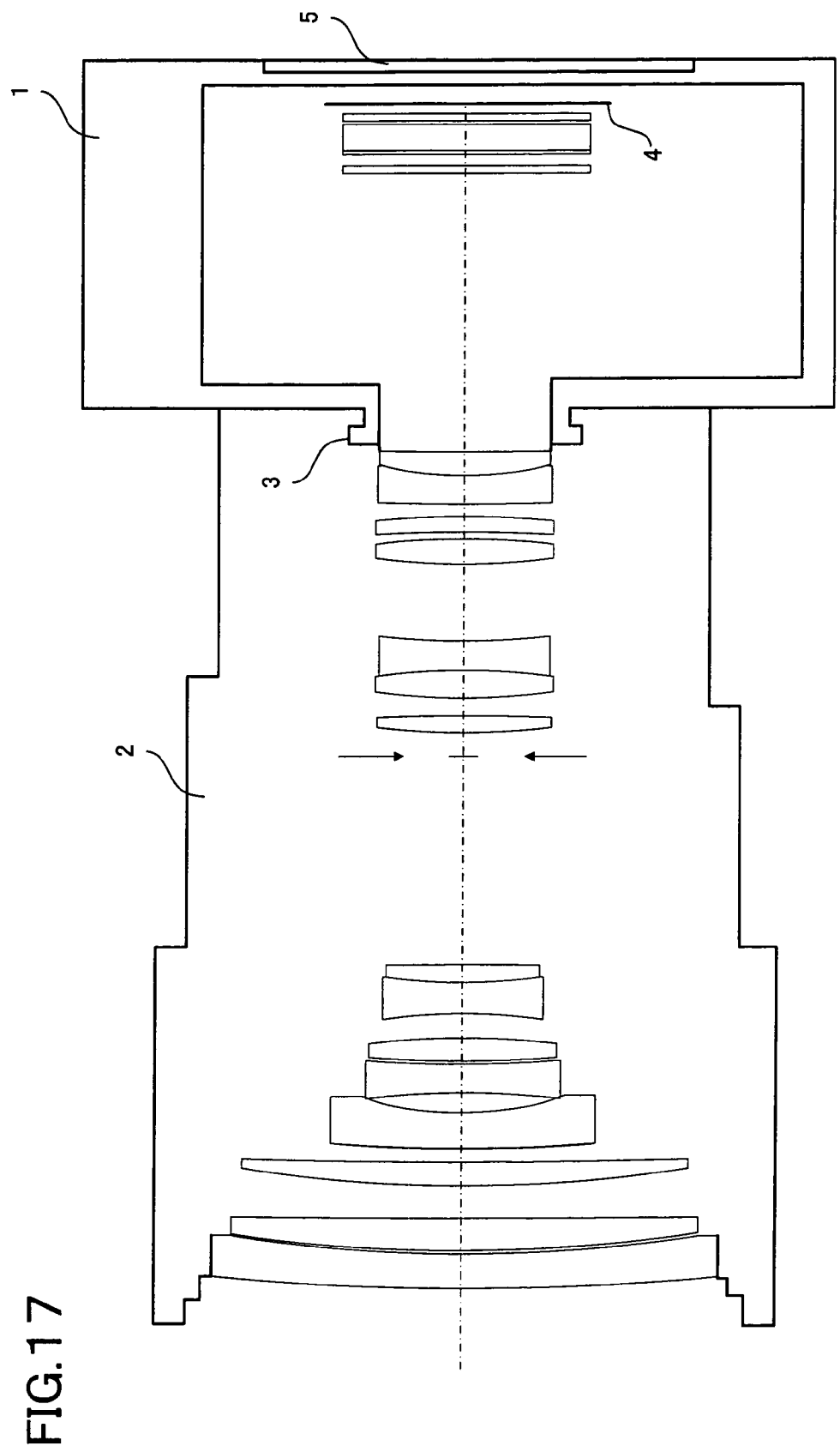
FIG. 17 is a cross-sectional view of a single lens reflex camera that uses a zoom lens of the present invention as interchangeable lens.

FIG. 17 is a cross-sectional view of a single lens reflex camera that uses the zoom lens, uses a small CCD, CMOS or the like as an image-pickup element and serves as an electronic image-pickup device. In FIG. 17, the reference numeral 1 denotes the single lens reflex camera. The reference numeral 2 denotes a picture-taking lens system disposed in a lens barrel. The reference numeral 3 denotes a mounting section of the lens barrel that allows the picture-taking lens system 2 to be mounted on or dismounted from the single lens reflex camera 1, and the screw-type or bayonet-type mounting or other types of mounting is used. In the example here, the bayonet-type mounting is used. The reference numeral 4 denotes an image pickup element plane. The reference numeral 5 denotes a back monitor.

As the picture-taking lens system 2 of the single lens reflex camera 1 having the above configuration, the zoom lenses of the above first to eighth embodiments may be used.

According to the above configurations, it is possible to provide a zoom lens that can achieve both downsizing and lower costs and is easy to increase in performance as an interchangeable zoom lens suitable for a digital single lens reflex camera.

What is claimed is:

1. A zoom lens comprising, from an object side in the following order:
   a first lens group that has a positive refractive power;
   a second lens group that has a negative refractive power;
   a third lens group that has a positive refractive power; and
   a fourth lens group that has a positive refractive power, wherein:
   when magnification is changed from a wide angle end to a telephoto end, the lens groups each move so as to increase the distance between the first and second lens groups and to decrease the distance between the second and third lens groups and the distance between the third and fourth lens groups; and
   the following conditional expressions (1) and (2) are satisfied:

$$5.5 < f1/fw < 8.0 \qquad (1); \text{ and}$$

$$0.5 < \Sigma d3/\Sigma d4 < 0.9 \qquad (2)$$

where
   fw is the focal length of the entire system of the zoom lens at the wide angle end;
   f1 is the focal length of the first lens group;
   $\Sigma d3$ is the actual distance on an optical axis from the lens surface that is closest to an object to the lens surface that is closest to an image in the third lens group; and
   $\Sigma d4$ is the actual distance on an optical axis from the lens surface that is closest to the object to the lens surface that is closest to the image in the fourth lens group.

2. The zoom lens according to claim 1, wherein when magnification is changed from the wide angle end to the telephoto end, the second lens group moves so as to leave a convex track at the image side.

3. The zoom lens according to claim 1, wherein when magnification is changed from the wide angle end to the telephoto end, the second lens group moves so as to leave a convex track at the object side after moving so as to leave a convex track at an image side.

4. The zoom lens according to claim 1, wherein the following conditional expression (3) is satisfied:

$$7<|f1/f2|<20 \quad (3)$$

where
f1 is the focal length of the first lens group; and
f2 is the focal length of the second lens group.

5. The zoom lens according to claim 1, wherein all positive lenses that the first lens group includes satisfy the following conditional expression (4):

$$vd1p>62 \quad (4)$$

where
vd1p is the Abbe number of each positive lens of the first lens group.

6. The zoom lens according to claim 1, wherein the following conditional expression (5) is satisfied:

$$0.7<|f2/fw|<0.9 \quad (5)$$

where
f2 is the focal length of the second lens group; and
fw is the focal length of the entire system of the zoom lens at the wide angle end.

7. The zoom lens according to claim 1, wherein the following conditional expression (6) is satisfied:

$$0.40<m1/ft<0.70 \quad (6)$$

where
m1 represents the distance the first lens group travels between the wide angle end and the telephoto end while the movement toward the object side is of positive sign; and
ft is the focal length of the entire system of the zoom lens at the telephoto end.

8. The zoom lens according to claim 1, wherein the following conditional expression (7) is satisfied:

$$1.2 \leq f3/f4<5.0 \quad (7)$$

where
f3 is the focal length of the third lens group; and
f4 is the focal length of the fourth lens group.

9. The zoom lens according to claim 1, wherein the following conditional expression (8) is satisfied:

$$0.3<(D3w-D3t)/fw<1.0 \quad (8)$$

where
D3w is the distance, on an optical axis and at the wide angle end, from the surface that is closest to the image in the third lens group to the surface that is closest to the object in the fourth lens group; and
D3t is the distance, on an optical axis and at the telephoto end, from the surface that is closest to the image in the third lens group to the surface that is closest to the object in the fourth lens group.

10. The zoom lens according to claim 1, wherein the second lens group comprises two negative lenses that are positioned closest to the object side in the second lens group, and, out of the two negative lenses, the second negative lens from the object side satisfies the following conditional expression (9):

$$-0.40<Sf_{2n2}/0.50 \quad (9)$$

where
there is the definition $Sf_{2n2}=(R_{2n2f}+R_{2n2r})/(R_{2n2f}-R_{2n2r})$;
$R_{2n2f}$ is the curvature radius of the object-side surface of the second negative lens from the object side in the second lens group; and
$R_{2n2r}$ is the curvature radius of the image-side surface of the second negative lens from the object side in the second lens group.

11. The zoom lens according to claim 1, wherein the second lens group includes at least one aspheric surface.

12. The zoom lens according to claim 1, wherein the fourth lens group includes at least one aspheric surface.

13. The zoom lens according to claim 1, wherein the second lens group consists of a front sub-unit having a negative refractive power and a rear sub-unit having a negative refractive power; and
when the focus shifts from a distant object to a nearby object, the front and rear sub-units of the second lens group move in the direction of the optical axis while changing the distance between the front and rear sub-units.

14. The zoom lens according to claim 1, wherein a variable magnification ratio is greater than or equal to four.

15. A zoom lens comprising, from an object side in the following order:
a first lens group that has a positive refractive power;
a second lens group that has a negative refractive power;
a third lens group that has a positive refractive power; and
a fourth lens group that has a positive refractive power,
wherein:
when magnification is changed from a wide angle end to a telephoto end, the lens groups each move so as to increase the distance between the first and second lens groups and to decrease the distance between the second and third lens groups and the distance between the third and fourth lens groups;
the first and second lens groups satisfy the following conditional expression (3); and
all positive lenses that the first lens group includes satisfy the following conditional expression (4):

$$7<|f1/f2|<20 \quad (3); \text{ and}$$

$$vd1p>62 \quad (4)$$

where
f1 is the focal length of the first lens group;
f2 is the focal length of the second lens group; and
vd1p is the Abbe number of each positive lens of the first lens group.

16. The zoom lens according to claim 15, wherein the following conditional expression (1) is satisfied:

$$5.5<f1/fw<8.0 \quad (1)$$

where
f1 is the focal length of the first lens group; and
fw is the focal length of the entire system of the zoom lens at the wide angle end.

17. The zoom lens according to claim 15, wherein the following conditional expression (2) is satisfied:

$$0.5<\Sigma d3/\Sigma d4<0.9 \quad (2)$$

where
- Σd3 is the actual distance on an optical axis from the lens surface that is closest to an object to the lens surface that is closest to an image in the third lens group; and
- Σd4 is the actual distance on an optical axis from the lens surface that is closest to the object to the lens surface that is closest to the image in the fourth lens group.

18. The zoom lens according to claim 15, wherein
when magnification is changed from the wide angle end to the telephoto end, the second lens group moves so as to leave a convex track at the object side after moving so as to leave a convex track at an image side.

* * * * *